(12) United States Patent
Takeuchi et al.

(10) Patent No.: US 10,708,468 B2
(45) Date of Patent: Jul. 7, 2020

(54) IMAGE PROCESSING METHOD, IMAGE PROCESSING DEVICE AND PRINTING SYSTEM UTILIZING DIFFERENT GRADATION TABLES IN OVERLAPPING REGIONS BASED ON ATTRIBUTE AND ENVIRONMENTAL INFORMATION

(71) Applicant: SEIKO EPSON CORPORATION, Tokyo (JP)

(72) Inventors: Yasutoshi Takeuchi, Nagano (JP); Naoki Sudo, Nagano (JP); Tetsuya Matsumura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 50 days.

(21) Appl. No.: 15/868,057

(22) Filed: Jan. 11, 2018

(65) Prior Publication Data

US 2018/0213125 A1    Jul. 26, 2018

(30) Foreign Application Priority Data

Jan. 23, 2017    (JP) ................................ 2017-009165

(51) Int. Cl.
| | |
|---|---|
| *H04N 1/60* | (2006.01) |
| *G06K 15/10* | (2006.01) |
| *B41J 2/21* | (2006.01) |
| *B41J 2/01* | (2006.01) |

(52) U.S. Cl.
CPC .......... *H04N 1/6091* (2013.01); *B41J 2/2132* (2013.01); *G06K 15/105* (2013.01); *H04N 1/6019* (2013.01); *H04N 1/6097* (2013.01); *B41J 2/01* (2013.01)

(58) Field of Classification Search
None
See application file for complete search history.

(56) References Cited

U.S. PATENT DOCUMENTS

| 6,439,683 B1* | 8/2002 | Matsumoto | .......... G06K 15/102 347/15 |
|---|---|---|---|
| 9,016,821 B2* | 4/2015 | Masuda | .................. B41J 2/155 347/15 |
| 2005/0116974 A1* | 6/2005 | Suzuki | ................ B41J 2/04551 347/10 |

(Continued)

FOREIGN PATENT DOCUMENTS

JP    2011-189512 A    9/2011

*Primary Examiner* — Barbara D Reinier
(74) *Attorney, Agent, or Firm* — Global IP Counselors, LLP

(57) ABSTRACT

An image processing method includes dividing a desired image into a normal region formed with partial images and a joint region formed by overlapping the partial images, first converting image data in an RGB color space corresponding to the normal region into normal region CMYK data in a CMYK color space using a normal region LUT, second converting the image data in the RGB color space corresponding to the joint region into joint region CMYK data in the CMYK color space using a joint region LUT derived based on attribute information of the printing medium and environmental information of an environment in which the printing apparatus is to perform printing, and generating printing data based on the normal region CMYK data and the joint region CMYK data.

11 Claims, 12 Drawing Sheets

(56) References Cited

U.S. PATENT DOCUMENTS

2009/0015849 A1\* 1/2009 Jahana ................... B41J 2/2146
358/1.8
2011/0221816 A1 9/2011 Miyamoto
2013/0101328 A1\* 4/2013 Morovic ............ H04N 1/00005
400/76

\* cited by examiner

<RELATED ART>

FIG. 9

MEDIUM TYPE M1

|      | 10°C | 15°C | 20°C | 25°C | 30°C | 35°C |
|------|------|------|------|------|------|------|
| LUT1 |      |      |      | ○    | ○    | ○    |
| LUT2 | ○    | ○    | ○    |      |      |      |
| LUT3 |      |      |      |      |      |      |
| LUT4 |      |      |      |      |      |      |
| LUT5 |      |      |      |      |      |      |
| LUT6 |      |      |      |      |      |      |
| LUT7 |      |      |      |      |      |      |

MEDIUM TYPE M2

|      | 10°C | 15°C | 20°C | 25°C | 30°C | 35°C |
|------|------|------|------|------|------|------|
| LUT1 |      |      |      | ○    | ○    | ○    |
| LUT2 |      | ○    | ○    |      |      |      |
| LUT3 | ○    |      |      |      |      |      |
| LUT4 |      |      |      |      |      |      |
| LUT5 |      |      |      |      |      |      |
| LUT6 |      |      |      |      |      |      |
| LUT7 |      |      |      |      |      |      |

MEDIUM TYPE M3

|      | 10°C | 15°C | 20°C | 25°C | 30°C | 35°C |
|------|------|------|------|------|------|------|
| LUT1 |      |      |      |      |      | ○    |
| LUT2 |      |      |      | ○    | ○    |      |
| LUT3 |      | ○    | ○    |      |      |      |
| LUT4 | ○    |      |      |      |      |      |
| LUT5 |      |      |      |      |      |      |
| LUT6 |      |      |      |      |      |      |
| LUT7 |      |      |      |      |      |      |

MEDIUM TYPE M4

|      | 10°C | 15°C | 20°C | 25°C | 30°C | 35°C |
|------|------|------|------|------|------|------|
| LUT1 |      |      |      |      |      |      |
| LUT2 |      |      |      | ○    | ○    | ○    |
| LUT3 |      |      | ○    |      |      |      |
| LUT4 | ○    | ○    |      |      |      |      |
| LUT5 |      |      |      |      |      |      |
| LUT6 |      |      |      |      |      |      |
| LUT7 |      |      |      |      |      |      |

MEDIUM TYPE M5

|      | 10°C | 15°C | 20°C | 25°C | 30°C | 35°C |
|------|------|------|------|------|------|------|
| LUT1 |      |      |      |      |      |      |
| LUT2 |      |      |      |      |      |      |
| LUT3 |      |      |      |      |      |      |
| LUT4 | ○    | ○    | ○    | ○    | ○    | ○    |
| LUT5 |      |      |      |      |      |      |
| LUT6 |      |      |      |      |      |      |
| LUT7 |      |      |      |      |      |      |

MEDIUM TYPE M6

|      | 10°C | 15°C | 20°C | 25°C | 30°C | 35°C |
|------|------|------|------|------|------|------|
| LUT1 |      |      |      |      |      |      |
| LUT2 |      |      |      |      |      |      |
| LUT3 |      |      |      |      |      |      |
| LUT4 |      |      |      | ○    | ○    | ○    |
| LUT5 | ○    | ○    | ○    |      |      |      |
| LUT6 |      |      |      |      |      |      |
| LUT7 |      |      |      |      |      |      |

MEDIUM TYPE M7

|      | 10°C | 15°C | 20°C | 25°C | 30°C | 35°C |
|------|------|------|------|------|------|------|
| LUT1 |      |      |      |      |      |      |
| LUT2 |      |      |      |      |      |      |
| LUT3 |      |      |      |      |      |      |
| LUT4 |      |      |      |      |      |      |
| LUT5 | ○    | ○    | ○    | ○    | ○    | ○    |
| LUT6 |      |      |      |      |      |      |
| LUT7 |      |      |      |      |      |      |

MEDIUM TYPE M8

|      | 10°C | 15°C | 20°C | 25°C | 30°C | 35°C |
|------|------|------|------|------|------|------|
| LUT1 |      |      |      |      |      |      |
| LUT2 |      |      |      |      |      |      |
| LUT3 |      |      |      |      |      |      |
| LUT4 |      |      |      |      |      |      |
| LUT5 |      |      |      |      |      |      |
| LUT6 | ○    | ○    | ○    | ○    | ○    | ○    |
| LUT7 |      |      |      |      |      |      |

MEDIUM TYPE M9

|      | 10°C | 15°C | 20°C | 25°C | 30°C | 35°C |
|------|------|------|------|------|------|------|
| LUT1 |      |      |      |      |      |      |
| LUT2 |      |      |      |      |      |      |
| LUT3 |      |      |      |      |      |      |
| LUT4 |      |      |      |      |      |      |
| LUT5 |      |      |      |      |      |      |
| LUT6 |      |      |      |      |      |      |
| LUT7 | ○    | ○    | ○    | ○    | ○    | ○    |

IMAGE PROCESSING METHOD, IMAGE PROCESSING DEVICE AND PRINTING SYSTEM UTILIZING DIFFERENT GRADATION TABLES IN OVERLAPPING REGIONS BASED ON ATTRIBUTE AND ENVIRONMENTAL INFORMATION

BACKGROUND

1. Technical Field

The present invention relates to an image processing method, an image processing device and a printing system.

2. Related Art

An ink jet printer with serial heads can print an image of a desired size by alternately repeating printing with a band width corresponding to the head length (the length of a nozzle row) and feeding (transporting) a sheet (printing medium). In this method, in some cases, due to feeding accuracy of the sheet and deviation of landing positions of ink droplets discharged from a nozzle between bands, or the like, white streaks (light streaks) caused by widening of dot spacing occur or black streaks (dark streaks) caused by narrowing of dot spacing occur on the boundary of the bands. In order to suppress such banding due to the dark and light streaks, a method (partial overlap) is used in which a part of a region in the vicinity of the band boundary is allocated to the printing of each of the bands and overlapped printing is performed. In this method, since ink droplets are discharged onto the same region twice, in some cases, the joint part (overlapped printing region) is visually recognized as slight color unevenness with respect to other regions. Accordingly, JP-A-2011-189512 further discloses a liquid ejecting apparatus (printing apparatus) that corrects gradation values in the joint part, thereby making it possible to reduce the color unevenness.

However, in the liquid ejecting apparatus (printing apparatus) disclosed in JP-A-2011-189512, the degree of the effect of correcting the gradation values may differ on the joint part depending on the type of printing medium (for example, different permeability due to difference in materials), or the environment to perform printing (for example, difference in temperature and humidity). That is, even though optimum correction has been made for a specific printing medium, banding due to color unevenness is visually recognized on the joint part in other printing mediums. In addition, the optimum correction in one specific environment may not ensure that the banding due to color unevenness on the joint part is not visually recognized in other environments.

SUMMARY

The invention can be realized as following aspects or application examples.

Application Example 1

According to this application example, there is provided an image processing method of generating printing data for causing a printing apparatus to perform printing, the printing apparatus printing a desired image on a printing medium by repeatedly performing a partial printing operation of printing partial images that constitute a part of the desired image based on first image data in a first color space and a transport operation of moving the printing medium, the image processing method comprising dividing the desired image into a first image region formed with the partial images and a second image region formed by overlapping the partial images, first converting the first image data in the first color space corresponding to the first image region into second image data in a second color space using a first conversion table, second converting the first image data in the first color space corresponding to the second image region into third image data in the second color space using a second conversion table derived based on attribute information of the printing medium and environmental information of an environment in which the printing apparatus is to perform printing, and generating the printing data based on the second image data and the third image data.

In accordance with the application example, in the image processing method, the desired image (image to be printed on the printing medium) based on the first image data in the first color space is divided into the first image region formed with the partial images and the second image region formed by overlapping the partial images. Then, the first image data in the first color space corresponding to the first image region is converted into the second image data in the second color space using the first conversion table, and the first image data in the first color space corresponding to the second image region is converted into the third image data in the second color space using the second conversion table derived based on the attribute information of the printing medium and the environmental information of the environment in which the printing apparatus is to perform printing. Next, printing data is generated based on the second image data and the third image data.

That is, according to the application example, it is possible to convert the image data of the first image region formed with the partial images and the image data of the second image region formed by overlapping the partial images into the image data of another color space by using different conversion tables (for example, to convert the data of the RGB color space into the data of the CMYK color space).

In addition, the image data of the second image region formed by overlapping the partial image is converted using the conversion table (the second conversion table) derived based on the attribute information of the printing medium and the environmental information of the environment in which the printing apparatus is to perform printing. Therefore, in a case where the gradation scale of the second image region (the joint region of the image to be printed) formed by overlapping the partial images changes depending on the type of printing medium (for example, different permeability due to difference in materials), or the environment to perform printing (for example, difference in temperature), it is possible to perform appropriate correction according to the degree thereof. As a result, in printing a desired image that is formed by combining partial images, even when the printing medium or the printing environment is changed, it is possible to perform a higher quality of printing while suppressing the occurrence of banding due to the partial images.

Application Example 2

In the image processing method according to the application example, the second converting may include converting the first image data in the first color space corresponding to the second image region into third image data in the second color space using the second conversion table that is selected based on the attribute information of the printing medium on which the printing apparatus is to perform printing and the environmental information of the environment in which the printing apparatus is to perform printing, from among a plurality of second conversion tables corresponding to a plurality of predetermined types of printing mediums and a plurality of predetermined environments.

In accordance with the application example in the image processing method, the first image data in the first color space corresponding to the second image region is converted into third image data in the second color space using the second conversion table that is selected based on the attribute information of the printing medium on which the printing apparatus is to perform printing and the environmental information of the environment in which the printing apparatus is to perform printing, from among a plurality of second conversion tables corresponding to a plurality of predetermined types of printing mediums and a plurality of predetermined environments.

That is, a plurality of second conversion tables corresponding to a plurality of predetermined types of printing mediums and a plurality of predetermined environments is prepared in advance, thereby making it possible to appropriately select the second conversion table corresponding to the attribute information of the printing medium on which the printing apparatus is to perform printing and the environmental information of the environment in which the printing apparatus is to perform printing.

Therefore, according to the application example 2, similarly to the application example 1, it is possible to convert the image data of the first image region formed with the partial images and the image data of the second image region formed by overlapping the partial images into the image data of another color space by using different conversion tables (for example, to convert the data of the RGB color space into the data of the CMYK color space). Therefore, in a case where the gradation scale of the second image region (the joint region of the image to be printed) formed by overlapping the partial images changes depending on the type of printing medium (for example, different permeability due to difference in materials), or the environment to perform printing (for example, difference in temperature), it is possible to perform appropriate correction according to the degree thereof. As a result, in printing a desired image that is formed by combining partial images, even when the printing medium or the printing environment is changed, it is possible to perform a higher quality of printing while suppressing the occurrence of banding due to the partial images.

Furthermore, in the method of selecting among a plurality first conversion tables and a plurality of second conversion tables that have been prepared in advance, for example, processing can be performed faster than that in a case where the first conversion table and the second conversion table are calculated by a function, and the like.

Application Example 3

In the image processing method according to this application example, the environmental information may be temperature.

In accordance with the application example, in a case where the gradation scale of the second image region (the joint region of the image to be printed) formed by overlapping the partial images changes depending on the printing environmental temperature, it is possible to perform appropriate correction according to the degree thereof. As a result, in printing a desired image that is formed by combining partial images, even when the temperature of the printing environment is changed, it is possible to perform a higher quality of printing while suppressing the occurrence of banding due to the partial images.

Application Example 4

According to this application example, there is provided an image processing device for generating printing data for causing a printing apparatus to perform printing, the printing apparatus printing a desired image on a printing medium by repeatedly performing a partial printing operation of printing partial images that constitute a part of the desired image based on first image data in a first color space and a transport operation of moving the printing medium, the image processing device includes an image data acquisition section that acquires a first image data, an input section that inputs attribute information of the printing medium on which the printing apparatus is to perform printing and environmental information of an environment in which the printing apparatus is to perform printing, an image processing section that generates the printing data based on the acquired first image data, and a transmission section that transmits the generated printing data to the printing apparatus, and the image processing section divides the desired image into a first image region formed with the partial images and a second image region formed by overlapping the partial images, converts the first image data in the first color space corresponding to the first image region into second image data in a second color space using a first conversion table that is input to the input section, converts the first image data in the first color space corresponding to the second image region into third image data in the second color space using a second conversion table derived based on the attribute information of the printing medium that is input to the input section and the environmental information of the environment that is input to toe input section, and generates the printing data based on the second image data and the third image data.

In accordance with the application example, in the image processing device the desired image (the image to be printed on the printing medium) based on the first image data in the first color space is divided into the first image region formed with the partial images and the second image region formed by overlapping the partial images. Then, The first image data in the first color space corresponding to the first image region is converted into the second image data in the second color space using the first conversion table that is input to the input section, and the first image data in the first color space corresponding to the second image region is converted into the third image data in the second color space using a second conversion table derived based on the attribute information of the printing medium that is input to the input section and the environmental information of an environment that is input to the input section. Next, the printing data is generated based on the second image data and the third image data.

That is, according to the this application example, it is possible to convert the image data of the first image region formed with the partial images and the image data of the second image region formed by overlapping the partial images into the image data of another color space by using different conversion tables (for example, to convert the data of the RGB color space into the data of the CMYK color space).

In addition, the image data of the second image region formed by overlapping the partial images is converted using the conversion table (the second conversion table) derived based on the attribute information of the printing medium and the environmental information of the environment in which the printing apparatus is to perform printing. Therefore, in a case where the gradation scale of the second image region (the joint region of the image to be printed) formed by overlapping the partial images changes depending on the type of printing medium (for example, different permeability due to difference in materials), or the environment to perform printing (for example, temperature), it is possible to perform appropriate correction according to the degree thereof. As a result, in printing a desired image that is formed by combining partial images, even when the printing medium or the printing environment is changed, it is possible to perform a higher quality of printing while suppressing the occurrence of banding due to the partial images.

Application Example 5

In the image processing device according to this application example, the image processing section may convert the first image data in the first color space corresponding to the second image region into the third image data in the second color space using the second conversion table that is selected based on the attribute information of the printing medium that is input to the input section and the environmental information of the environment that is input to the input section, from among a plurality of second conversion tables corresponding to a plurality of predetermined types of printing mediums and a plurality of predetermined environments.

In accordance with the application example, in the image processing device, the first image data in the first color space corresponding to the second image region is converted into the third image data in the second color space using the second conversion table that is selected based on the attribute information of the printing medium that is input to the input section and the environmental information of the environment that is input to the input section, from among a plurality of second conversion tables corresponding to a plurality of predetermined types of printing mediums and a plurality of predetermined environments.

That is, according to this application example, a plurality of second conversion tables corresponding to a plurality of predetermined types of printing mediums and a plurality of predetermined environments is prepared in advance, thereby making it possible to appropriately select the second conversion table corresponding to the attribute information of the printing medium on which the printing apparatus is to perform printing and the environmental information of the environment in which the printing apparatus is to perform printing. As a result, for example, processing can be performed faster than that in a case where the second conversion table is calculated by a function, and the like.

Application Example 6

In the image processing device according to this application example, the environmental information may be temperature.

In accordance with the application example, in a case where the gradation scale of the second image region (the joint region of the image to be printed) formed by overlapping the partial images depending on the printing environmental temperature, it is possible to perform appropriate correction according to the degree thereof. As a result, in printing a desired image that is formed by combining partial images, even when the temperature of the printing environment is changed, it is possible to perform a higher quality of printing while suppressing the occurrence of banding due to the partial images.

Application Example 7

According to this application example, there is provided an image processing device for generating printing data for causing a printing apparatus to perform printing, the printing apparatus printing a desired image on a printing medium by repeatedly performing a partial printing operation of printing partial images that constitute a part of the desired image based on first image data in a first color space and a transport operation of moving the printing medium, the image processing device including an image data acquisition section that acquires a first image data, an input section that inputs attribute information of the printing medium on which the printing apparatus is to perform printing and environmental information of an environment in which the printing apparatus is to perform printing, an image processing section that generates the printing data based on the acquired first image data, and a transmission section that transmits the generated printing data to the printing apparatus, and the image processing section divides the desired image into a first image region formed with a plurality of partial images and a second image region formed by overlapping more partial images than the partial images constituting the first image region, converts the first image data in the first color space corresponding to the first image region into second image data in a second color space using a first conversion table, converts the first image data in the first color space corresponding to the second image region into third image data in the second color space using a second conversion table derived based on the attribute information of the printing medium that is input to the input section and the environmental information of an environment that is input to the input section, and generates the printing data based on the second image data and the third image data.

In accordance with the application example, in the image processing device, the desired image based on the first image data in the first color space is divided into the first image region formed with a plurality of partial images and the second image region formed by overlapping more partial images than the partial images constituting the first image region. Then, the first image data in the first color space corresponding to the first image region is converted into second image data in a second color space using the first conversion table that is input to the input section, and the first image data in the first color space corresponding to the second image region is converted into third image data in the second color space using the second conversion table derived based on the attribute information of the printing medium that is input to the input section and the environmental information of an environment that is input to the input section. Next, the printing data is generated based on the second image data and the third image data.

That is, according to the this application example, it is possible to convert the image data of the first image region formed with a plurality of partial images and the image data of the second image region formed by overlapping more partial images than the partial images constituting the first image region into the image data of another color space by using different conversion tables (for example, to convert the data of the RGB color space into the data of the CMYK color space).

In addition, the image data of the second image region is converted using the conversion table (second conversion table) derived based on the attribute information of the printing medium and the environmental information of the environment in which the printing apparatus is to perform printing. Therefore, in a case where the gradation scale of the second image region (the second image region formed by overlapping more partial images than the partial images constituting the first image region) changes depending on the type of printing medium (for example, different permeability due to difference in materials), or the environment to perform printing (for example, temperature), it is possible to perform appropriate correction according to the degree thereof. As a result, in printing a desired image that is formed by combining partial images, even when the printing medium or the printing environment is changed, it is possible to perform a higher quality of printing while suppressing the occurrence of banding due to the partial images.

Application Example 8

According to this application example, there is provided a printing system including the image processing device according to application examples described above, and a printing apparatus for performing printing based on printing data generated by the image processing device.

In accordance with the printing system of the application example, even when the printing medium or the printing environment is changed, it is possible to perform a high quality of printing while suppressing the occurrence of banding.

BRIEF DESCRIPTION OF THE DRAWINGS

The invention will be described with reference to the accompanying drawings, wherein like numbers reference like elements.

FIG. 9 is comparison charts summarizing examples of evaluation results in tables.

DESCRIPTION OF EXEMPLARY EMBODIMENTS

Hereinafter, an embodiment of the invention will be described with reference to accompanying drawings. The embodiment described below does not limit the invention.

Further, following drawings may be drawn to the scale different from the actual scale for easy understanding. In addition, in coordinates illustrated in drawings, a Z axis direction refers to an up-down direction, where the +Z axis direction is the up direction, a X axis direction refers to an front/rear direction, where the −X axis direction is the front direction, a Y axis direction refers to a right/left direction, where the +Y axis direction is the left direction, and the X-Y plane refers to the horizontal plane.

Embodiment

Figure 1:
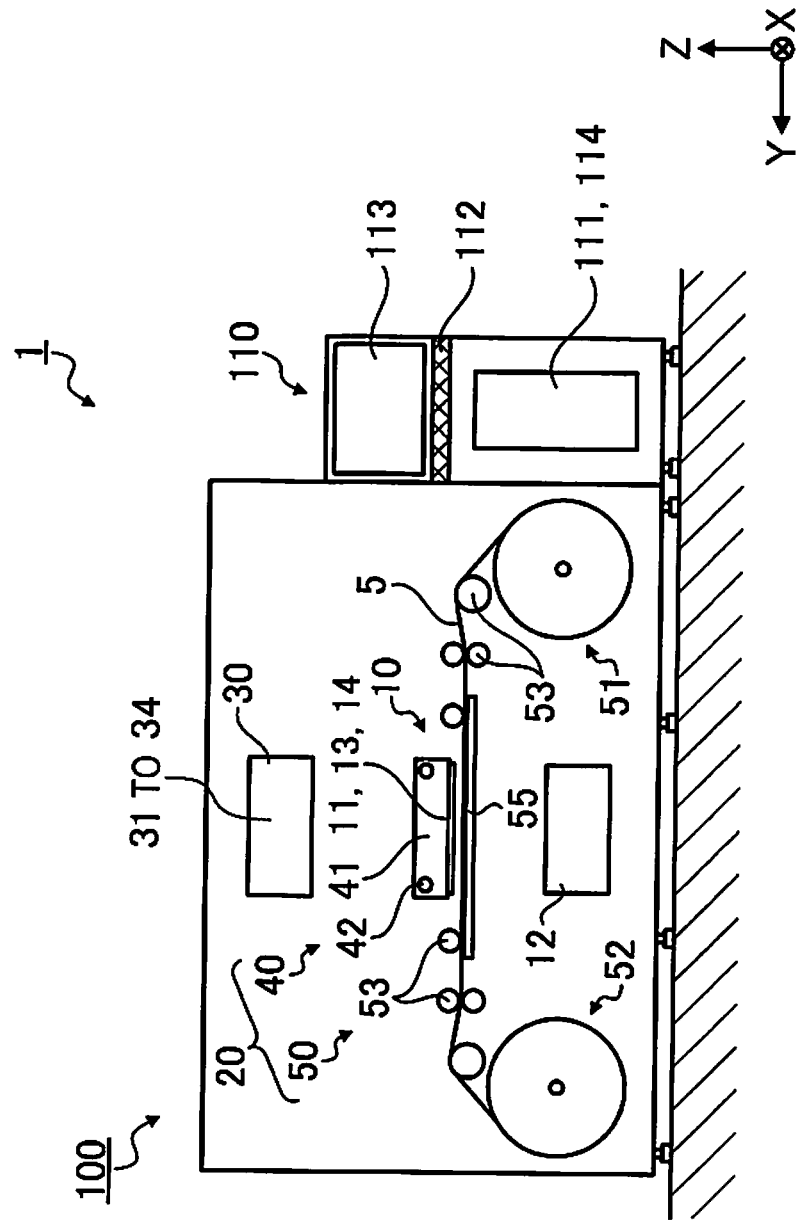
FIG. 1 is a front view showing a configuration of a printing system according to an embodiment.
Figure 2:
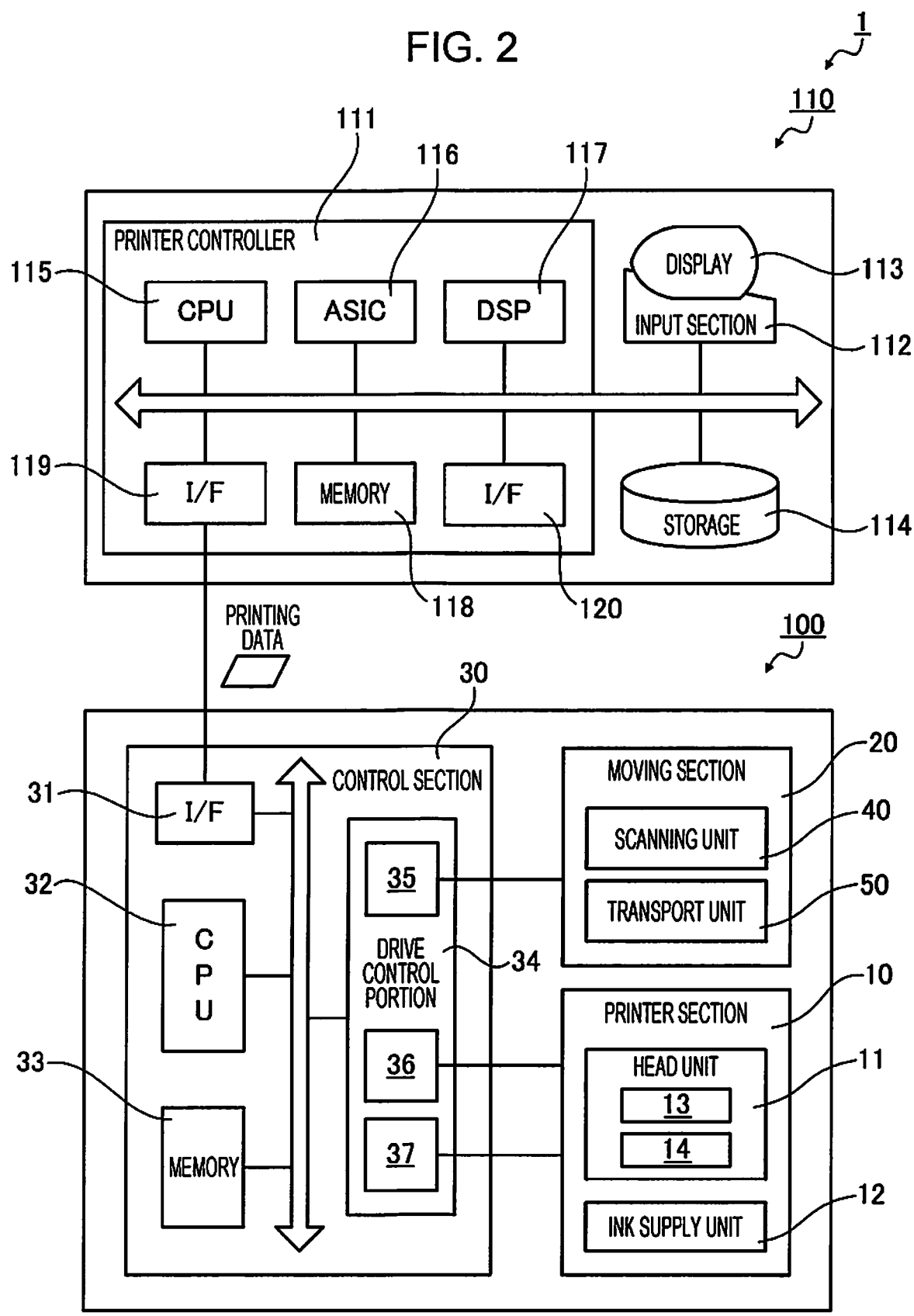
FIG. 2 is a block diagram showing the configuration of the printing system according to the embodiment.

FIG. 1 is a front view showing a configuration of a printing system according to an embodiment, and FIG. 2 is a block diagram showing the configuration of the printing system according to the embodiment.

A printing system 1 is configured to include a printer 100 as a "printing apparatus", and an image processing device 110 connected to the printer 100. The printer 100 is an ink jet printer printing a desired image on an elongated printing medium 5 that is feed from a roll around which the printing medium 5 is wound based on printing data received from the image processing device 110.

Examples of the printing medium 5 include high-quality paper, cast paper, art paper, coated paper, synthetic paper, and the like. However, the printing medium 5 is not limited thereto, and for example, a cloth, Polyethylene Terephthalate (PET), and Polypropylene (PP) may be used as the printing medium.

Basic Configuration of Image Processing Device

The image processing device 110 includes a printer controller 111, an input section 112, a display 113, a storage 114, or the like, and controls a print job that causes the printer 100 to perform printing. The image processing device 110 is configured using a personal computer as a preferred example.

Software for operating the image processing device 110 includes general image processing application software (hereinafter, referred to as 'application') that handles image data to be printed, and printer driver software (hereinafter, referred to as 'printer driver) that generates printing data for controlling the printer 100 and causing the printer 100 to execute printing.

Here, the image data to be printed is "first image data" in a "first color space", where the "first color space" is, for example, an RGB color space. That is, the "first color space" is a space of image data, "first image data", which is obtained by a general-purpose image acquisition device (for example, a digital camera) such as the RGB color space. Hereinafter, the "first color space" will be described as the RGB color space, and the "first image data" in the "first color space" will be described as the image data.

The image data includes, for example, general full color image information obtained by a digital camera or the like, text information, and code information.

The image processing device 110 generates the printing data for causing the printer 100 to print a desired image based on the image data.

The printer controller 111 includes a Central Processing Unit (CPU) 115, an Application Specific Integrated Circuit (ASIC) 116, a Digital Signal Processor (DSP) 117, a memory 118, a printer interface 119, a general-purpose interface 120, and the like, and centrally manages the entire printing system 1.

The input section 112 is a means for inputting information as a human interface. Specifically, the input section 112 is, for example, a keyboard or a port to which an information input device is connected.

The display 113 is a means for displaying information as a human interface, and under the control of the printer controller 111, displays information input from the input section 112, an image to be printed by the printer 100, information related to a printing job, or the like.

The storage 114 is a rewritable storing medium such as a hard disk drive (HDD) or a memory card, and stores software for operating the image processing device 110 (program with which the printer controller 111 is operated), an image to be printed, information related to the print job, or the like.

The memory 118 is a storage medium for securing an area storing a program with which the CPU 115 operates, a working area in which the program operates, and the like, and is constituted by a storage element such as a Random Access Memory (RAM), an Electrically Erasable Programmable Read Only Memory (EEPROM), or the like.

The general-purpose interface 120 is, for example, an interface that can permit the system to be connected to external electronic devices, such as a Local Area Network (LAN) interface and a Universal Serial Bus (USB) interface, and in the embodiment functions as an "image data acquisition section".

Basic Configuration of Printer 100

The printer 100 includes a printer section 10, a moving section 20, a control section 30, and the like. Upon receiving printing data from the image processing device 110, the printer 100 controls the printer section 10 and the moving section 20 through the control section 30, and prints an image on the printing medium 5 (image formation).

The printing data is image formation data obtained by converting the image data so that the image data can be printed by the printer 100 through the application and the printer driver provided by the image processing device 110, and includes a command for controlling the printer 100.

The code information is an identifier representing a numerical value and a character by a combination of figures of a bar or a cell, such as a two-dimensional code of a barcode or matrix type, a three-dimensional code with a color tone or gradation in a matrix cell, or the like.

The printer section 10 includes a head unit 11, an ink supply unit 12, and the like.

The moving section 20 includes a scanning unit 40, a transport unit 50, and the like. The scanning unit 40 includes a carriage 41, a guide shaft 42, a carriage motor (not shown), and the like. The transport unit 50 includes a supply unit 51, a storage unit 52, a transport roller 53, a platen 55, and the like.

The head unit 11 includes a printing head 13 having a plurality of nozzles (nozzle row) discharging liquid (hereinafter, referred to as 'ink') for printing as droplets (hereinafter, referred to as 'ink droplet'), and a head control unit 14. The head unit 11 is mounted on the carriage 41, and reciprocates in a scanning direction with on the carriage 41 moving the scanning direction (the X-axis direction in FIG. 1). While moving in the scanning direction, the head unit 11 (printing head 13) discharges ink droplets onto the printing medium 5 supported by the platen 55 under the control of the control section 30, which results in a row of dots (raster line) being formed along the scanning direction on the printing medium 5.

The ink supply unit 12 includes an ink tank, an ink supply passage (not shown) for supplying ink from the ink tank to the printing head 13, and the like.

For example, an ink set composed of dark ink compositions is used as ink, and the ink set may be a four color ink set obtained by adding black (K) to an ink set of three colors of cyan (c), magenta (M), and yellow (Y). In addition, for example, an eight color ink set is used as ink, where the ink set is an ink set obtained by further adding light cyan (Lc), light magenta (Lm), light yellow (Ly) and light black (Lk), which are light ink compositions in which the density of each color material is made light. An ink supply path from the ink tank through the ink supply passage to the nozzle that discharges the same ink is independently provided for each ink.

A piezo method is used for a method of discharging ink droplets (ink jet method). In the piezo method, pressure corresponding to a printing information signal is applied to ink reserved in a pressure chamber by a piezoelectric element (piezo element), and ink droplets are ejected (discharged) from a nozzle that communicates with the pressure chamber for printing.

A method of discharging ink is not limited thereto, and other printing methods may be used in which ink is discharged in a form of droplets to form a group of dots on a printing medium. For example, there may be methods such as a method of continuously ejecting ink in a droplet form from a nozzle to a strong electric field between the nozzle and an acceleration electrode disposed in front of the nozzle and giving the printing information signal from a deflection electrode while the droplets are flying for printing, a method of ejecting ink droplets corresponding to the printing information signal without deflecting the ink droplets (electrostatic suction method), a method of forcibly ejecting ink droplets by applying pressure to the ink with a small pump and mechanically vibrating the nozzle with a crystal vibrator or the like, or a method of heating and foaming ink with a microelectrode according to the printing information signal and ejecting ink droplets for printing (thermal jet method).

The moving section 20 (the scanning unit 40, the transport unit 50) moves the printing medium 5 relatively with respect to the head unit 11 (printing head 13) under the control of the control section 30.

The guide shaft 42 extends in the scanning direction and supports the carriage 41 in a slidable contact state, and the carriage motor serves as a driving source when the carriage 41 reciprocates along the guide shaft 42. That is, the scanning unit 40 (carriage 41, guide shaft 42, carriage motor) moves the carriage 41 (that is, the printing head 13) in the scanning direction along the guide shaft 42 under the control of the control section 30.

The supply unit 51 rotatably supports a reel around which the printing medium 5 is wound in a roll shape and transports the printing medium 5 to a transport path. The storage unit 52 rotatably supports a reel for winding the printing medium 5 and allows the printing medium 5 on which printing has been completed to be wound from the transport path.

The transport roller 53 is composed of a driving roller that moves the printing medium 5 in a transport direction (Y-axis direction shown in FIG. 1) intersecting with the scanning direction, a driven roller that rotates with the movement of the printing medium 5, and the like, and forms a transport path for transporting the printing medium 5 from the supply unit 51 to the storage unit 52 via the printing region of the printer section 10 (the region where the printing head 13 perform scan movement on the upper surface of the platen 55).

The control section 30 includes an interface 31, a CPU 32, a memory 33, a drive control portion 34, and the like, and controls the printer 100.

The interface 31 is connected to a printer interface 119 of the image processing device 110, and performs data transmission and reception between the image processing device 110 and the printer 100. The image processing device 110 and the printer 100 may be connected directly with a cable, or indirectly through a network or the like. Further, transmission and reception of data between the image processing device 110 and the printer 100 may be performed through wireless communication.

The CPU 32 is an arithmetic processing device for controlling the entire printer 100.

The memory 33 is a storage medium for securing an area storing a program with which the CPU 32 operates, a working area in which the program operates, and the like, and is constituted by a storage element such as a RAM, an EEPROM or the like.

The CPU 32 controls the printer section 10 and the moving section 20 through the drive control portion 34 according to the program stored in the memory 33 and the printing data received from the image processing device 110.

The drive control portion 34 controls driving of the printer section 10 (head unit 11, ink supply unit 12) and the moving section 20 (the scanning unit 40, the transport unit 50) under the control of the CPU 32. The drive control portion 34 includes a movement control signal generation circuit 35, a discharge control signal generation circuit 36, and a drive signal generation circuit 37.

The movement control signal generation circuit 35 is a circuit that generates a signal for controlling the moving section 20 (the scanning unit 40, the transport unit 50), according to an instruction from the CPU 32.

The discharge control signal generation circuit 36 is a circuit that generates a head control signal for selecting a nozzle to discharge ink, selecting a discharging amount, controlling timing to discharge ink, and so on, according to an instruction from the CPU 32 based on the printing data.

The drive signal generation circuit 37 is a circuit that generates a basic drive signal including a drive signal for driving the piezoelectric element of the printing head 13.

The drive control portion 34 selectively drives the piezoelectric elements corresponding to respective nozzles based on the head control signal and the basic drive signal.

With the above configuration, the control section 30 repeats the pass operation of discharging (applying) ink droplets from the printing head 13 while moving the carriage 41 supporting the printing head 13 along the guide shaft 42 in the scanning direction (the X-axis direction) with respect to the printing medium 5 supplied to the printing region by the transport unit 50 (the supply unit 51, the transport roller 53), and the transport operation of moving the printing medium 5 in the transport direction (+Y-axis direction) intersecting with the scanning direction by the transport unit 50 (the transport roller 53), thereby forming (printing) a desired image on the printing medium 5.

That is, the printer 100 repeats the pass operation as a 'partial printing operation' of printing a 'partial image' that forms a part of a desired image with respect to the printing medium 5 based on the image data (first image data) in the RGB color space (first color space), and the transport operation of moving the printing medium 5, thereby printing the desired image.

Basic Function of Printer of the Related Art

Figure 3:
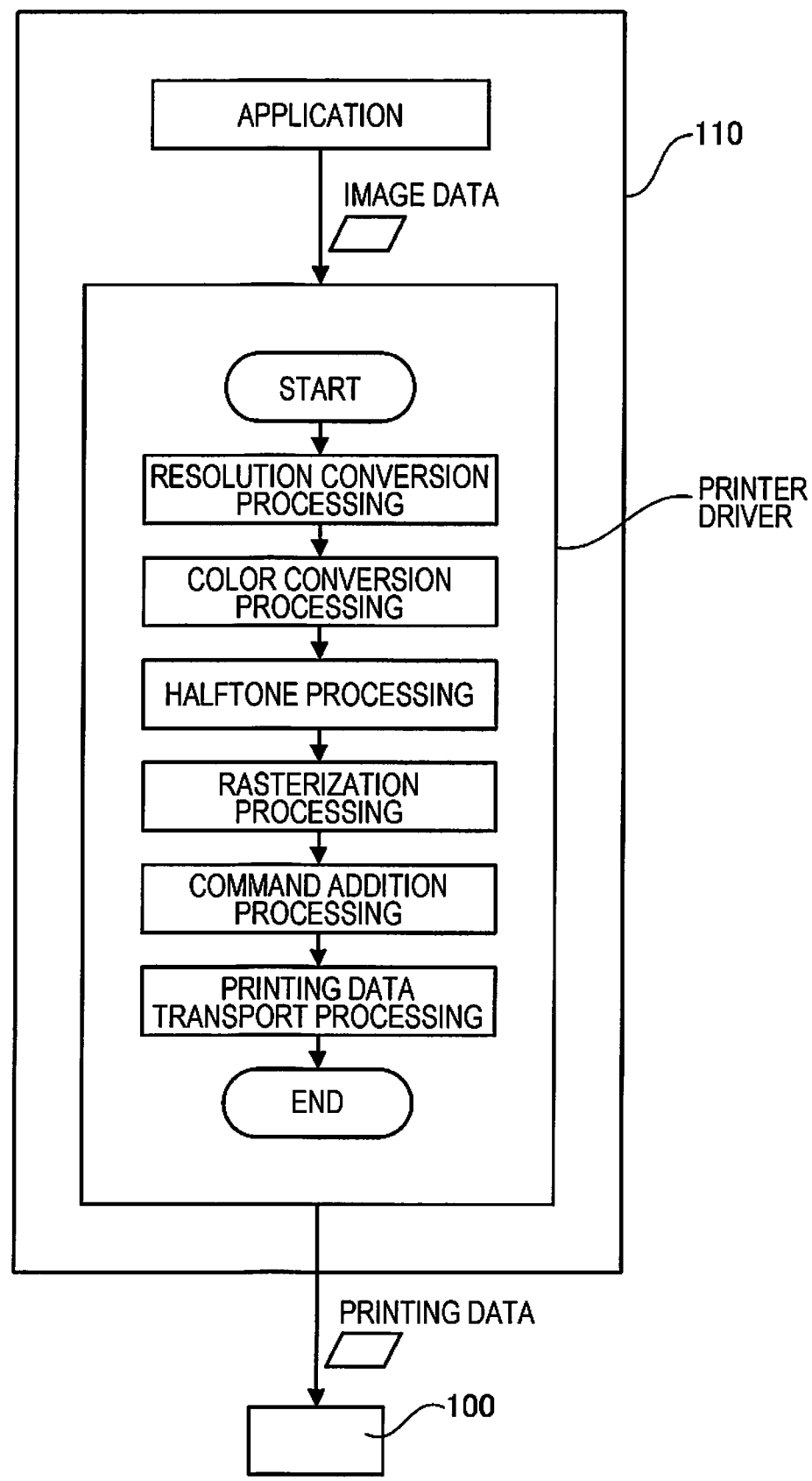
FIG. 3 is a view showing basic functions of a printer driver of the related art.

FIG. 3 is a view describing basic functions of a printer driver of the related art.

Printing on the printing medium 5 is started by printing data being transmitted from the image processing device 110 to the printer 100. The printing data is generated by the printer driver.

That is, the printer driver constitutes an 'image processing section' of the image processing device 110 as a functional unit by software.

Hereinafter, a printing data generation processing in the related art will be described with reference to FIG. 3.

The printer driver receives image data from an application, converts the image data into printing data of a format interpretable by the printer 100, and outputs the printing data to the printer 100. When the image data is converted from the application into the printing data, the printer driver performs resolution conversion processing, color conversion processing, halftone processing rasterization processing, command addition processing, and the like.

A resolution conversion processing is a processing of converting the image data output from the application into the resolution at the time of performing printing on the printing medium 5 (printing resolution). For example, when the printing resolution is specified as 720×720 dpi, the image data of a vector format received from the application is converted into the image data of a bitmap format with 720×720 dpi.

Each pixel data of the image data after the resolution conversion processing is composed of pixels arranged in a matrix form. Each pixel has a gradation value of 256 gradations in the RGB color space, for example. That is, the pixel data after the resolution conversion indicates the gradation value of the corresponding pixel.

Pixel data corresponding to one column aligned in a predetermined direction among pixels arranged in the matrix form is called raster data. The predetermined direction in which pixels corresponding to the raster data are aligned corresponds to the moving direction (scanning direction) of the printing head 13 at the time of printing an image.

The color conversion processing is the processing for converting RGB data into CMYK color space data. CMYK colors are cyan (C), magenta (M), yellow (Y), and black (K), and image data in the CMYK color space is data corresponding to ink colors available in the printer 100. Therefore, for example, when the printer 100 uses ten kinds of inks of the CMYK color system, the printer driver generates image data of the ten-dimensional space of the CMYK color system based on the RGB data.

The color conversion processing is performed based on a table in which gradation values of the RGB data and gradation values of the CMYK color system data are associated with each other (color conversion look-up table). In addition, the pixel data after the color conversion processing is the CMYK color system data of, for example, 256 gradations represented by the CMYK color space.

A half-tone processing is a processing of converting data of a high gradation number (256 gradations) into data of the number of gradations that can be formed by the printer 100. Through the half-tone processing, the data representing 256 gradations is converted into, for example, one-bit data representing two gradations (with or without dots), or two-bit data representing four gradations (no dot, small dot, medium dot, large dot). Specifically, from a dot generation rate table in which the gradation value (0 to 255) is associated with the dot generation rate, a dot generation rate associated with a gradation value (for example, in a case of four gradations, the generation rate of each of no dot, small dot, medium dot, and large dot) is obtained, and at the obtained generation rate, pixel data is created such that dots are formed in a dispersed manner using a dither method, an error diffusion method, and the like.

A rasterization processing is a processing of rearranging pixel data (for example, as described above, one-bit or two-bit data) aligned in the matrix form according to the dot formation order at the time of printing. The rasterization processing includes an allocating processing of allocating image data constituted by pixel data after the half-tone processing to each pass operation in which the printing head 13 (nozzle row) discharges ink droplets while scanning and moving. When the allocation is completed, the pixel data aligned in the matrix form is allocated to an actual nozzle forming each raster line that forms the printing image.

A command addition processing is a processing of adding command data corresponding to the printing method to the data subjected to the rasterization processing. The command data includes, for example, transport data relating to a transport specification (an amount of movement in the transport direction, speed, or the like) of the printing medium 5.

The processing by the printer driver are performed by the ASIC 116 and the DSP 117 under the control of the CPU 115 (see FIG. 2), and the generated printing data is transmitted to the printer 100 via the printer interface 119 by a printing data transmission processing. That is, in the present embodiment, the printer interface 119 functions as a 'transmission section' that transmits the generated printing data to the printer 100.

Nozzle Row

Figure 4:
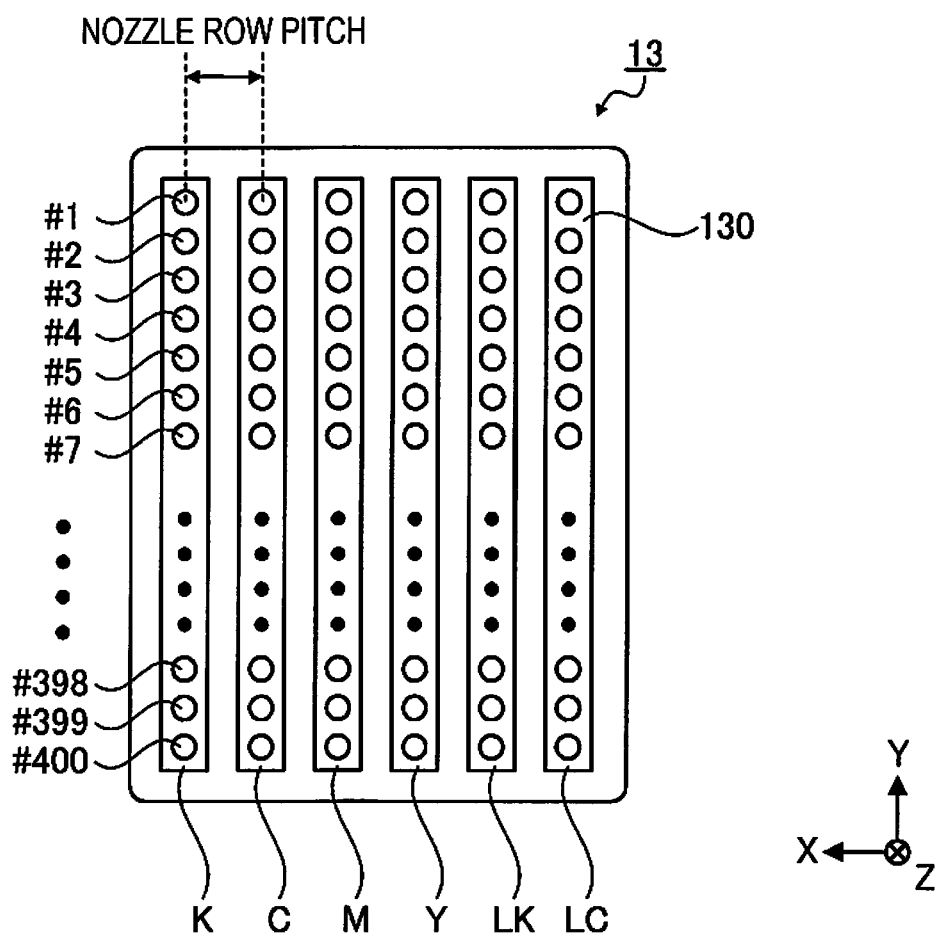
FIG. 4 is a schematic view showing an example of arrangement of nozzles as seen from the lower surface of a printing head.

FIG. 4 is a schematic view showing an example of arrangement of nozzles as seen from the lower surface of the printing head 13.

As shown in FIG. 4, The printing head 13 includes nozzle rows 130 in which a plurality of nozzles for discharging ink of each color are arranged side by side (in an example shown in FIG. 4, a black ink nozzle row K, a cyan ink nozzle row C, a magenta ink row M, a yellow ink row Y, a gray ink row LK, a light cyan ink nozzle array LC, which are each composed of 400 nozzles #1 to #400).

A plurality of nozzles in each nozzle row 130 are aligned at a constant interval (nozzle pitch) along the transport direction (Y-axis direction). Also, a plurality of nozzle rows 130 is arranged at a constant interval (nozzle row pitch) along the direction intersecting with the transport direction (X-axis direction) such that nozzle rows 130 are parallel to each other. In FIG. 4, nozzles of each nozzle row 130 are assigned numbers, where the nozzle on the further downstream side has the smaller number (#1 through #400). That is, the nozzle #1 is positioned downstream of the nozzle #400 in the transport direction. Each nozzle is provided with a driving element (piezoelectric element such as the piezo element described above) for driving each nozzle to discharge ink droplets.

Suppression of Banding in the Related Art

Figure 5:
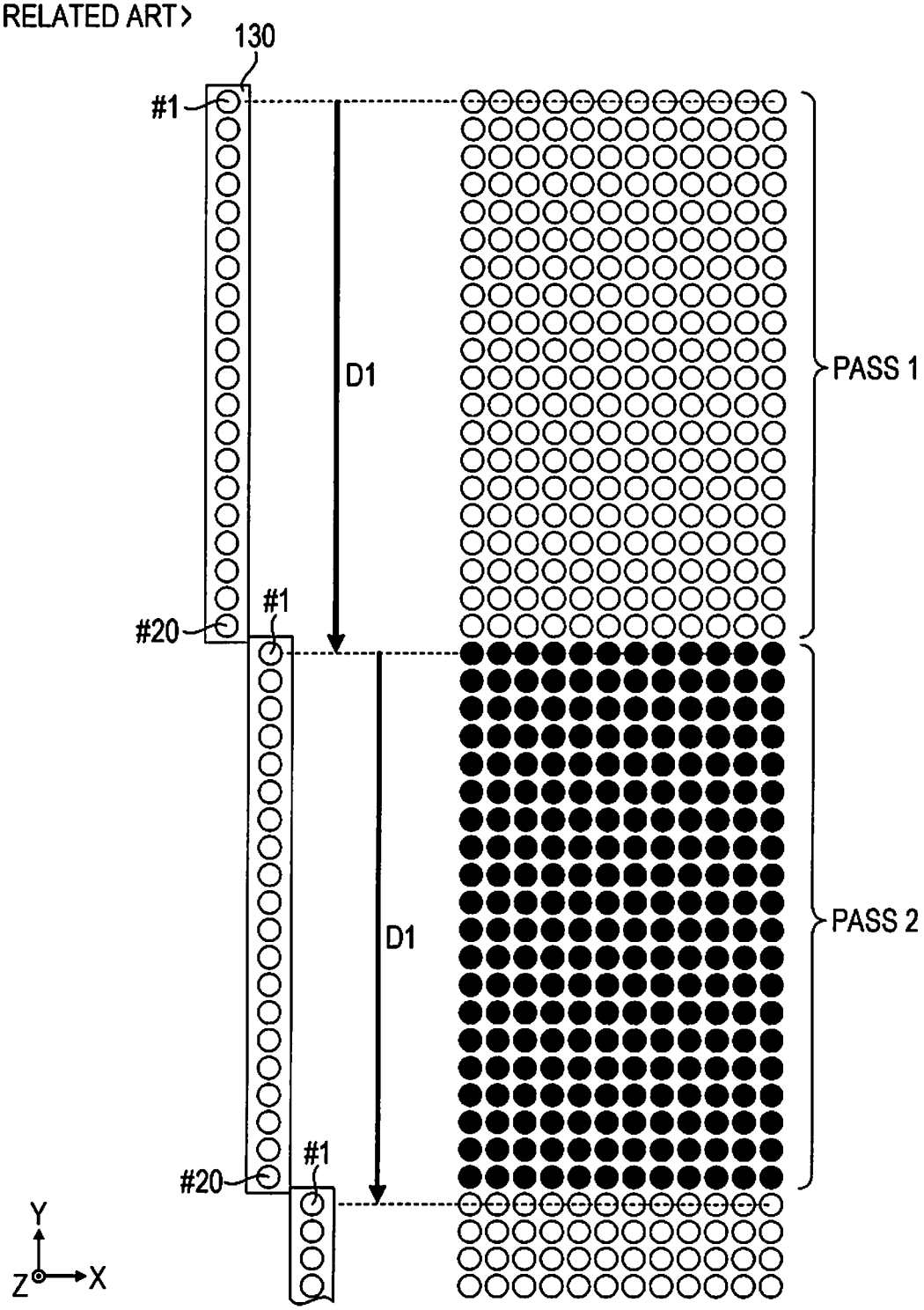
FIG. 5 is a view showing an example of band printing of the related art.

FIG. 5 is a view describing an example of band printing of the related art, and shows the relative position of the nozzle row 130 constituting the printing head 13 and the positional relationship of dots formed by pass operation as the printing medium 5 moves in the transport direction (+Y direction). For simplicity of description, the nozzle row 130 shown in FIG. 5 is assumed to have n numbers of nozzles (n=20), for example. Further, D1 shown in FIG. 5 is a sub-scanning transport amount which is a transport amount between pass operations.

In FIG. 5, the relative position of the nozzle row 130 due to step movement for each sub-scanning transport amount D1 of the printing medium 5 by the transport unit 50 is shown in an oblique direction so that the nozzle row 130 does not overlap each other. That is, in FIG. 5, the nozzle row 130 is depicted as moving in the −Y direction, but actually the printing medium 5 moves in the +Y direction. Further, the positional relationship of the nozzle rows 130 in the X axis has no meaning.

In the following description, a single pass operation (hereinafter, simply referred as a pass in some cases), in which dots are formed by discharging ink from the nozzle rows 130 while moving in the scanning direction, means forming dots accompanying one movement in the scanning direction. A desired image based on image data is printed by combining, in the Y direction, partial images to be printed by dot formation accompanying one movement in the scanning direction.

As shown in FIG. 5, in a case where the sub-scanning transport amount D1 is the width (length in the Y-axis direction) of the partial image formed by one pass operation, when the sub-scanning of the sub-scanning transport amount D1 is performed every time the nozzle row 130 performs one pass operation, there is no overlap of partial images printed by the pass operation, whereby it is possible to perform efficient printing. However, in the method, due to feeding accuracy of the printing medium 5 in the Y-axis direction and deviation of landing positions of the ink droplets discharged from the nozzles between the bands (between partial images), or the like, white streaks (light streaks) caused by widening of dot spacing may occur or black streaks (dark streaks) caused by narrowing of dot spacing may occur on the boundary of the bands (partial images).

Figure 6:
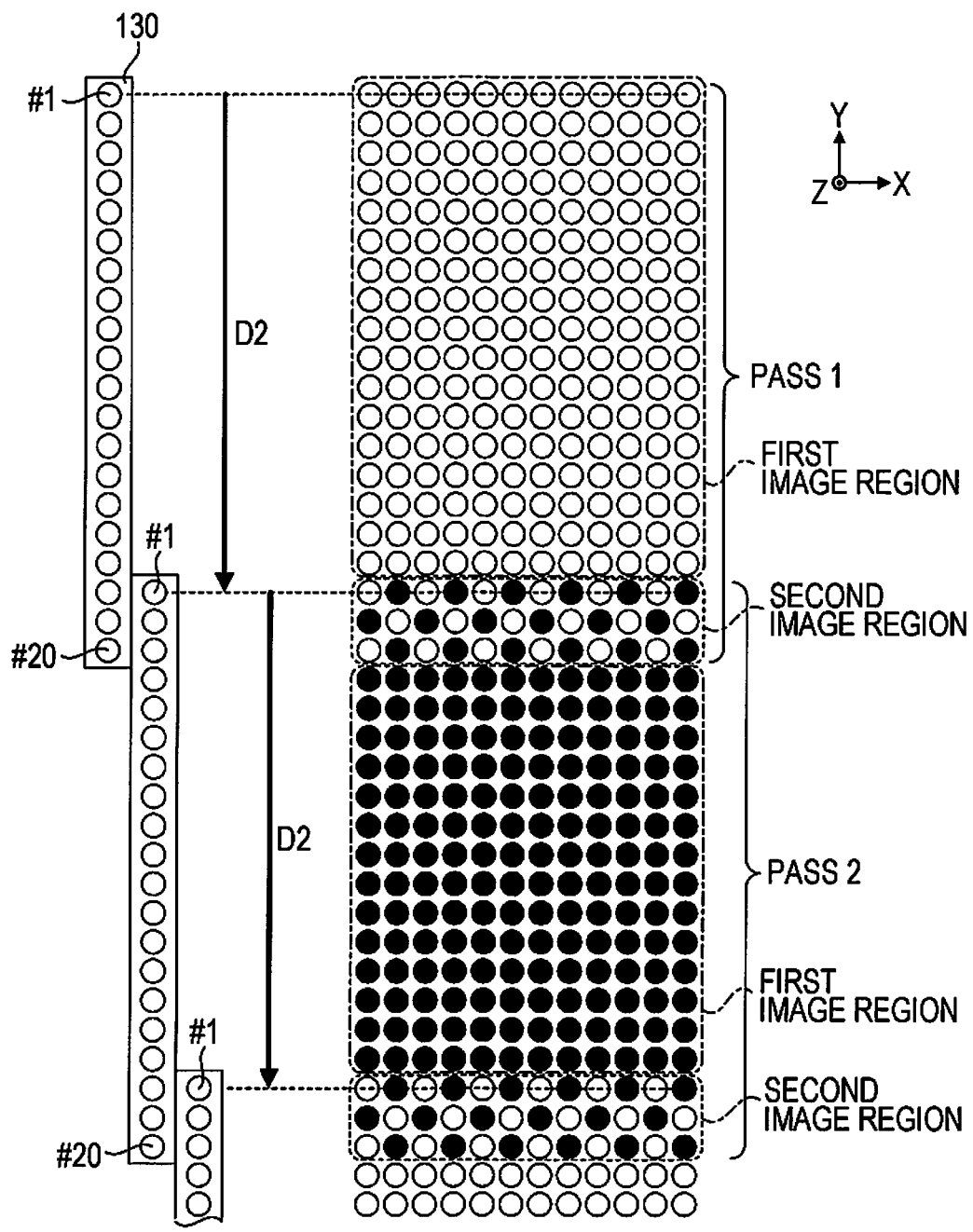
FIG. 6 is a schematic view showing a method of printing a region of a part in the vicinity of a boundary of bands in an overlapped manner.

In order to suppress such banding by the dark and light streaks, a method (partial overlap) is used in which a part of a region in the vicinity of the band boundary is allocated to the printing of each of the bands (pass operation) and overlapped printing is performed. FIG. 6 is an explanatory view showing an example of this method. Dots formed by pass1 are indicated by white circles, and dots formed by pass2 are indicated by black circles.

In the example shown in FIG. 6, the sub-scanning transport amount is set to D2 which is shorter by 3 dot rows than D1 so that the partial images formed by each pass operation are overlapped by three dot rows. As shown in FIG. 6, in a region where partial images formed by each pass operation are overlapped (joint region), dots to be formed are alternately arranged every other one and allocated to each pass operation.

According to the method, dispersion of boundary of bands can suppress banding due to the dark and light streaks. However, since timing of discharging at the same region is performed twice, that is, pass1 and pass2, the joint part is visually recognized as slight color unevenness with respect to other regions in some cases. It is presumably because, when ink droplets of pass2 are applied after the ink droplets applied in pass1 penetrates into the printing medium 5 to some extent or after the ink droplets dry to some extent, there is a tendency that the rate at which the color material of the ink of pass2 remains near the surface of the printing medium 5 is larger than that when it is in normal printing (the case where ink droplets are applied onto the entire surface in pass1).

On the other hand, by correcting the gradation value of the joint part, the occurrence of the color unevenness can be reduced. However, in some cases, the degree of the effect of correcting the gradation values differs on the joint part depending on the type of printing medium 5 (for example, different permeability of inks due to difference in materials), or the environment to perform printing (for example, difference in temperature and humidity). That is, even though optimum correction has been made for a specific printing medium 5, banding due to color unevenness is visually recognized on the joint part in other printing mediums 5. In addition, the optimum correction in one specific environment may not ensure that the banding due to color unevenness on the joint part is not visually recognized in other environments.

Suppression of Banding in the Embodiment

In the image processing device 110 of the embodiment, it is possible to dynamically change the gradation value of the joint region corresponding to difference in the type of the printing medium 5 and the environment to perform printing and change thereof. It will be described below in detail.

As described above, the image processing device 110 includes the general-purpose interface 120, the input section 112, the printer driver as an image processing section, and the printer interface 119.

The image processing device 110 can acquire image data (first image data) through the general-purpose interface 120.

Through the input section 112, the attribute information of the printing medium 5 and the environmental information of the environment in which the printer 100 is to perform printing can be input to the image processing device 110.

The attribute information of the printing medium 5 is information that can specify the type of the printing medium 5, for example, a product name or a product model number of the printing medium 5. Further, for example, information such as a material name or a specification constituting the printing medium 5 may be used.

The environmental information of the environment in which the printer 100 is to perform printing is, for example, temperature or humidity. The temperature or humidity at the place where the printer 100 is installed is input directly by an operator from a keyboard, or temperature or humidity of the surface to be printed of the printing medium 5 is detected by a sensor and the like and is input to the image processing device 110 by a method in which automatic input from a port is performed.

The printer driver generates printing data based on the acquired image data by the method described below, and transmits the generated printing data to the printer 100 through the printer interface 119.

In the embodiment, the generation of printing data suppresses the color unevenness of the joint part from being visually recognized depending on the type of printing medium 5 (for example, different permeability due to difference in materials), or the environment to perform printing (for example, difference in temperature and humidity). Accordingly, the color conversion processing of the joint region is performed independently of the color conversion processing of the normal region. The color conversion processing of the joint region is performed using the color conversion look-up table derived based on the attribute information of the printing medium 5 and the environmental information of the environment in which the printer 100 is to perform printing. Specifically, in the generation of printing data, the color conversion look-up table used for the color conversion processing of the joint region is selected corresponding to the type of the printing medium 5 and the temperature of the environment from among a plurality of color conversion look-up tables prepared in advance through evaluation.

In the following description, for easy understanding, the "first image region" in which a desired image based on image data (first image data) is formed only by the partial image will be described as the "normal region", the "second image region" formed by overlapping partial images will be described as the "joint region", the "first conversion table" as a color conversion look-up table for performing color conversion processing of the normal region will be described as the "normal region LUT", and the "second conversion table" as a color conversion look-up table for performing color conversion processing of the joint region will be described as the "joint region LUT".

The normal region LUT (first conversion table) is the color conversion look-up table in the related art described above. On the other hand, the "second conversion table" is a color conversion look-up table characterizing the present invention.

As described above, the "first color space" will be described as the "RGB color space" and the "second color space" to be converted using the color conversion look-up table will be described as the "CMYK color space".

The "second image data" obtained by performing color conversion processing on the image data of the normal region with the normal region LUT will be described as the "normal region CMYK data", and the "third image data" obtained by performing color conversion processing on the image data of the joint region with the joint region LUT will be described as the "joint region CMYK data".

In the following description, "temperature" will be mainly described as the environmental information of the environment in which the printer 100 is to perform printing.

Preparation of Color Conversion Look-Up Table

First, the evaluation of associating a plurality of color conversion look-up tables prepared in advance for performing color conversion on the joint region (joint region LUT) with the type of the printing medium 5 and the temperature of the environment will be described.

Figure 7:
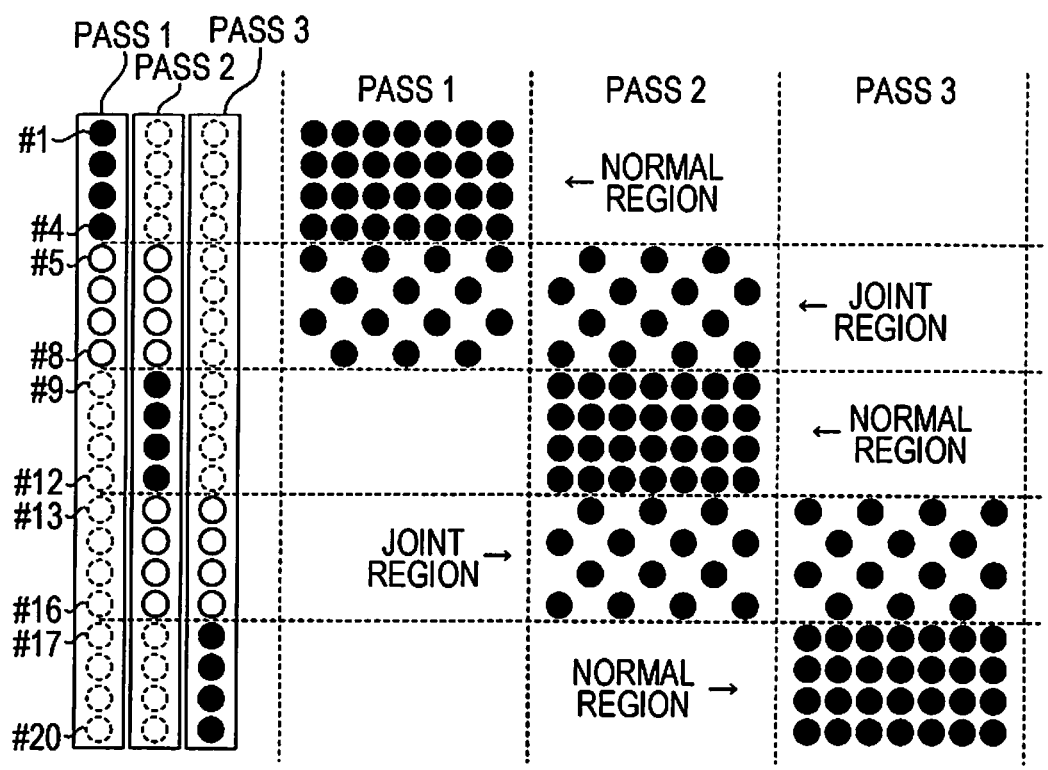
FIG. 7 is a view showing a printing method of an evaluation patch used for evaluation.
Figure 8:
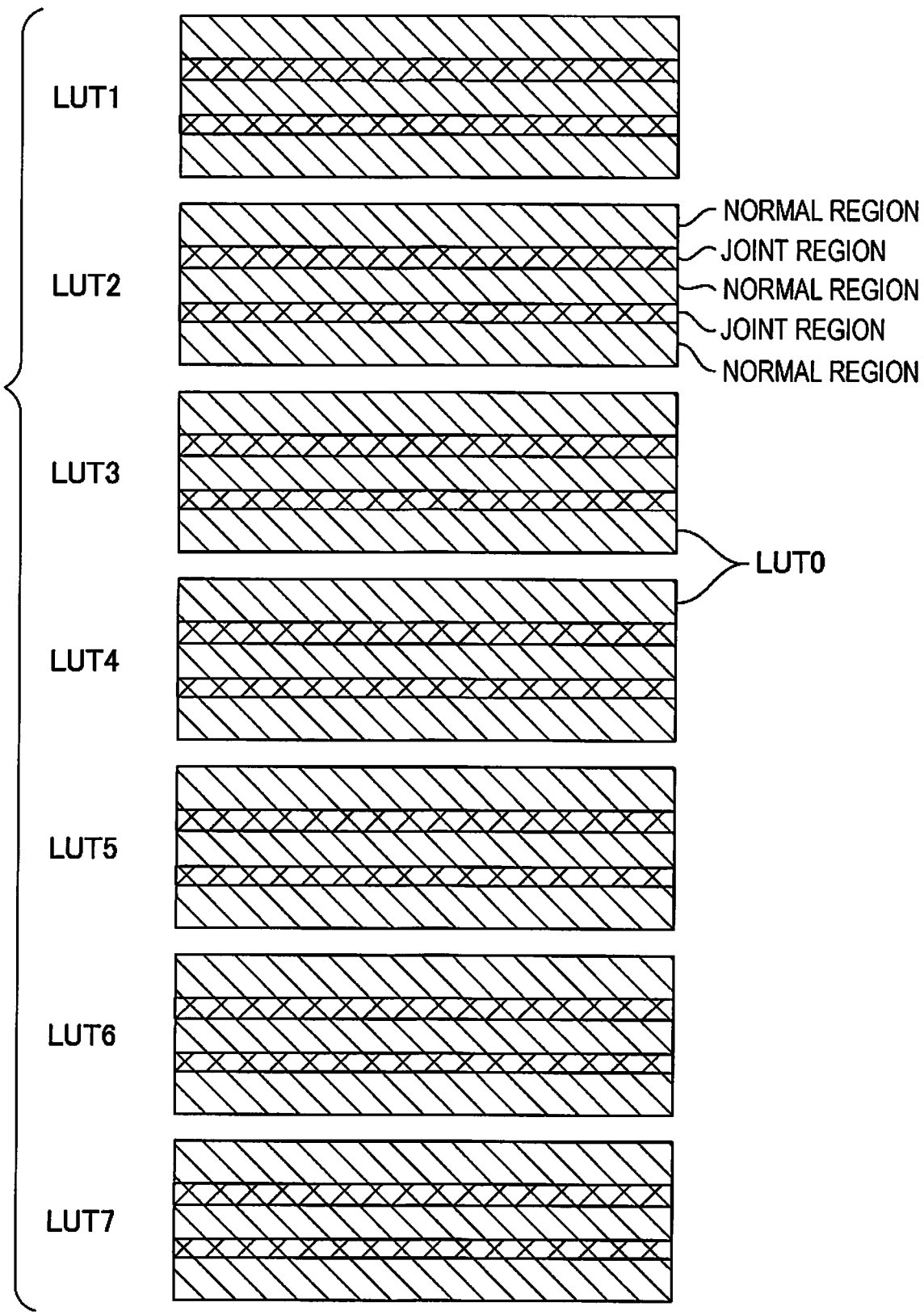
FIG. 8 is a view showing a printed evaluation patch set.

FIG. 7 is a view describing a printing method of a patch image (hereinafter, referred to as "patch") used for evaluation. FIG. 8 is a view describing a printed evaluation patch (evaluation patch set).

As shown in FIG. 7, the evaluation patch is formed in three passes by shifting the position of the nozzle applying ink droplets without moving the printing medium 5 so as to eliminate the influence of sub-scanning transport error.

In pass1, the normal region is printed by nozzles #1 to #4, and a part of the joint region is printed by nozzles #5 to #8.

In pass2, the remaining part of the joint region in pass1 is printed by nozzles #5 to #8, a new normal region is printed by nozzles #9 to #12, and a part of a new joint region is printed by nozzles #13 to #16.

In pass3, the remaining part of the joint region in pass2 is printed by nozzles #13 to #16, and a new normal region is printed by nozzles #17 to #20.

In this way, the evaluation patch is formed in which the normal region and the joint region are alternately disposed.

The evaluation patch is printed at a plurality of levels in the joint region LUT. FIG. 8 shows an example of an evaluation patch set printed by setting the normal region LUT to LUT 0 and performing color conversion processing on the joint region LUT at seven levels of LUT 1 to LUT 7. LUT 0 is, for example, the color conversion look-up table that becomes good at room temperature (20° C.) for the printing medium 5. Assuming that LUT 3 is the same as LUT 0, for example, The seven levels of LUT 1 and LUT 7 are the levels at which the gradation value gradually decreases toward LUT1 and gradually increases toward LUT 7.

Difference between respective levels is evaluated in advance in a sufficient temperature range. Accordingly, within the range covering a plurality of printing mediums 5 that are supposed to be targets of the printer 100 and use environments (temperature range) supposed by the printer 100, a plurality of effective options are set and configured.

When the evaluation patch set including a plurality of LUT levels as shown in FIG. 8 is printed in a specific environment and color unevenness is visually recognized in the joint region, the optimal LUT n (n is any one of 1 to 7) can be associated as the optimal joint region LUT in the specific environment.

Incidentally, the evaluation patch set including a plurality of LUT levels as shown in FIG. 8 can be printed with a color of which color unevenness is easy to be visually recognized, for example, blue or gray.

FIG. 9 is comparison charts summarizing examples of evaluation results for a plurality of printing mediums 5 under a plurality of temperature environments in tables. For nine types of printing mediums 5 (medium types M1 to M9), evaluation is performed in an environment at an interval of 5° C. in the range of the environmental temperature of 10° C. to 35° C.

For example, in a case of medium type M3, LUT3 is good as the joint region LUT at 20° C., but at 10° C. LUT4 is good, and at 35° C. LUT 1 is good. Further, medium types M5, M7, M8 and M9 differ from each other in LUTn that is evaluated as optimal, but indicate that LUTn evaluated as good is not changed even if the environmental temperature changes.

The image processing device 110 stores the evaluation result performed in advance on a plurality of printing mediums 5 that are supposed to be targets of the printer 100 as an information table (joint region LUT association table) associating candidates of a plurality of joint region LUTs with the type of printing medium 5 and the temperature in the environment. Specifically the information table of medium types M1 to M9 shown in FIG. 9 is stored in the storage 114 as the joint region LUT association table (refer to FIG. 2).

A plurality of printing mediums 5 can be associated with the information tables of the medium types M1 to M9, respectively, as the joint region LUT association table. That is, even when the printing medium name, the product model number, or the manufacturer as the attribute information of the printing medium 5 are different, for example, in a case where the material, construction, or the like of the printing mediums 5 are identical, a plurality of printing medium 5 can be grouped as the information table of the same medium Mn.

Method of Generating Printing Data: Example 1

Figure 10:
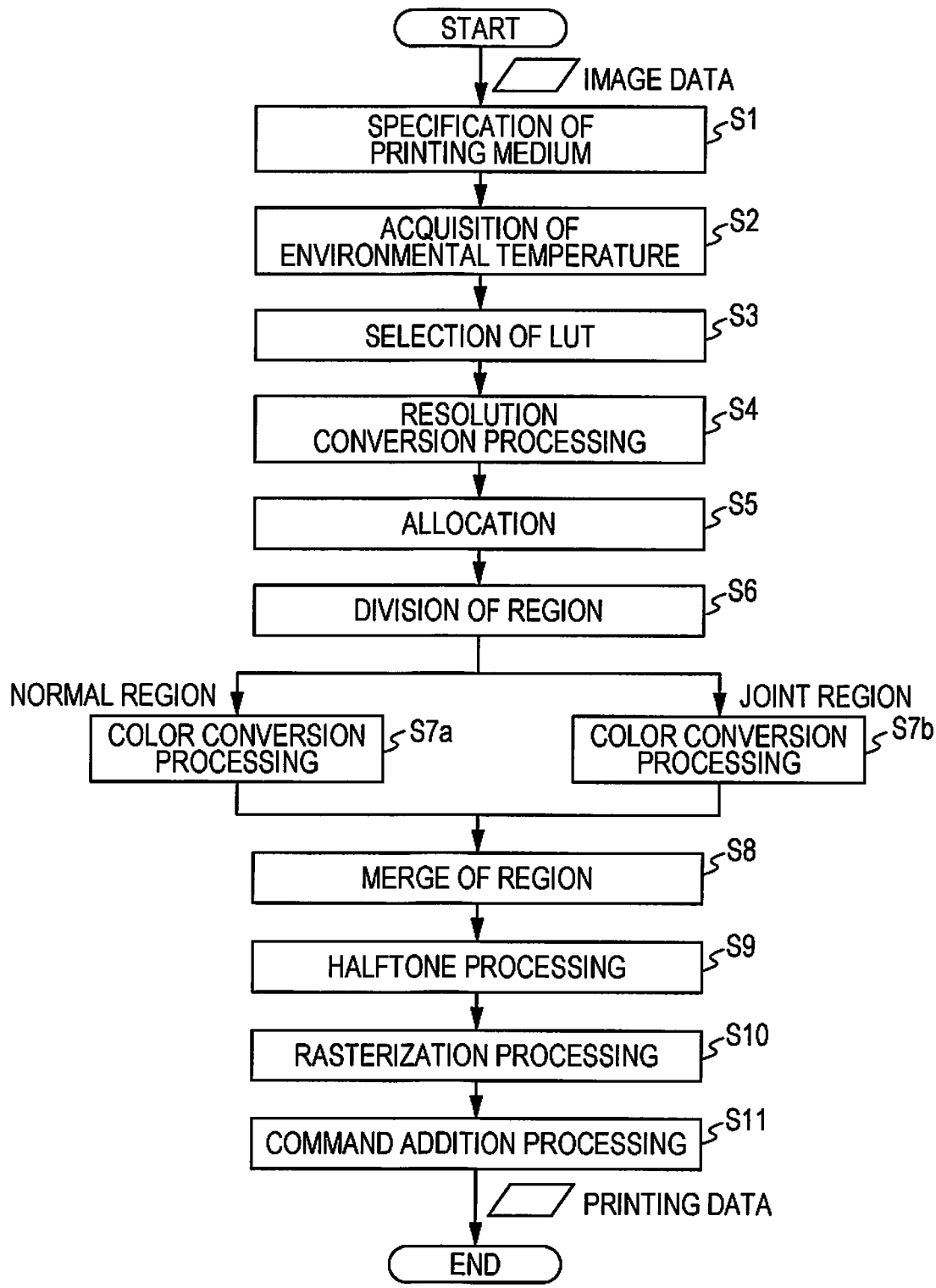
FIG. 10 is a flowchart showing a method of Example 1 for generating printing data.

FIG. 10 is a flowchart showing steps for generating printing data. A method of generating printing data as an "image processing method" characterizing the embodiment (that is, a method of generating printing data to be performed using the normal region LUT and the joint region LUT) will be described as Example 1 with reference to FIG. 10.

First, when the printer driver is activated and the attribute information (for example, printing medium name) for specifying the printing medium 5 to be printed on the printer 100 is input from the input section 112 (keyboard) (step S1). Specifically, for example, the operator selects an item corresponding to the printing medium 5 to be used among from the menu of printing mediums 5 displayed on the display 113 by the printer driver.

Next, the printer driver acquires printing environmental temperature data (step S2). Specifically, the temperature data can be input by the operator who recognizes the temperature of the environment through the input section 112 (keyboard), or can be automatically obtained from a sensor that detects the temperature of the surface to be printed of the printing medium 5.

When the printing medium 5 is selected, the printer driver acquires the joint region LUT association table associated with the type of the selected printing medium 5 from the storage 114. Specifically, for example, the joint region LUT association table of the medium type M3 (see FIG. 9) is acquired.

Next, the printer driver refers to the acquired joint region LUT association table and select the joint region LUT (LUTn) associated with the acquired printing environmental temperature (step S3). Specifically, for example, when the temperature is 20° C., LUT3 is selected as the joint region LUT.

Next, the printer driver performs resolution conversion processing (step S4) and subsequently performs band printing allocation processing (step S5) as "allocation step" based on the image data to be printed.

The allocation processing allocates partial printing constituting a desired image. By performing the allocation processing, the desired image can be divided into the normal region formed only by the partial image and the joint region formed by overlapping partial images (step S6). For example, when a printing mode (clean, high definition, high speed, or the like) is specified in advance, allocation processing is performed based on the printing mode.

Next, the printer driver performs color conversion processing for each of the divided regions (independent of the normal region and the joint region). Specifically, for the joint region, as the "second conversion step", color conversion processing is performed using the joint region LUT (LUTn acquired in step S3) associated with the type of the selected printing medium 5 and the temperature in the environment (step S7b), and for the normal region, as the "first conversion step", color conversion processing is performed using the normal region LUT associated with the normal region (step S7a).

Next, The result of the color conversion processing independently performed in the normal region and the joint region (that is, the normal region CMYK data and the joint region CMYK data) is merged into one (step S8).

Thereafter, as in the method in the related art, halftone processing (step S9), rasterization processing (step S10), command addition processing (step S11), and the like are performed to obtain printing data. In the embodiment, steps from step S8 to step S11 corresponds to "printing data generation step"

According to the method of generating printing data by the above steps, since the color conversion processing of the joint region can be made independent of the normal region and performed more appropriately, it is possible to perform high quality printing in which color unevenness is suppressed even at the printing medium 5 or the printing environmental temperature where color unevenness is easy to be visually recognized in the joint region.

Method of Generating Printing Data: Example 2

Figure 11:
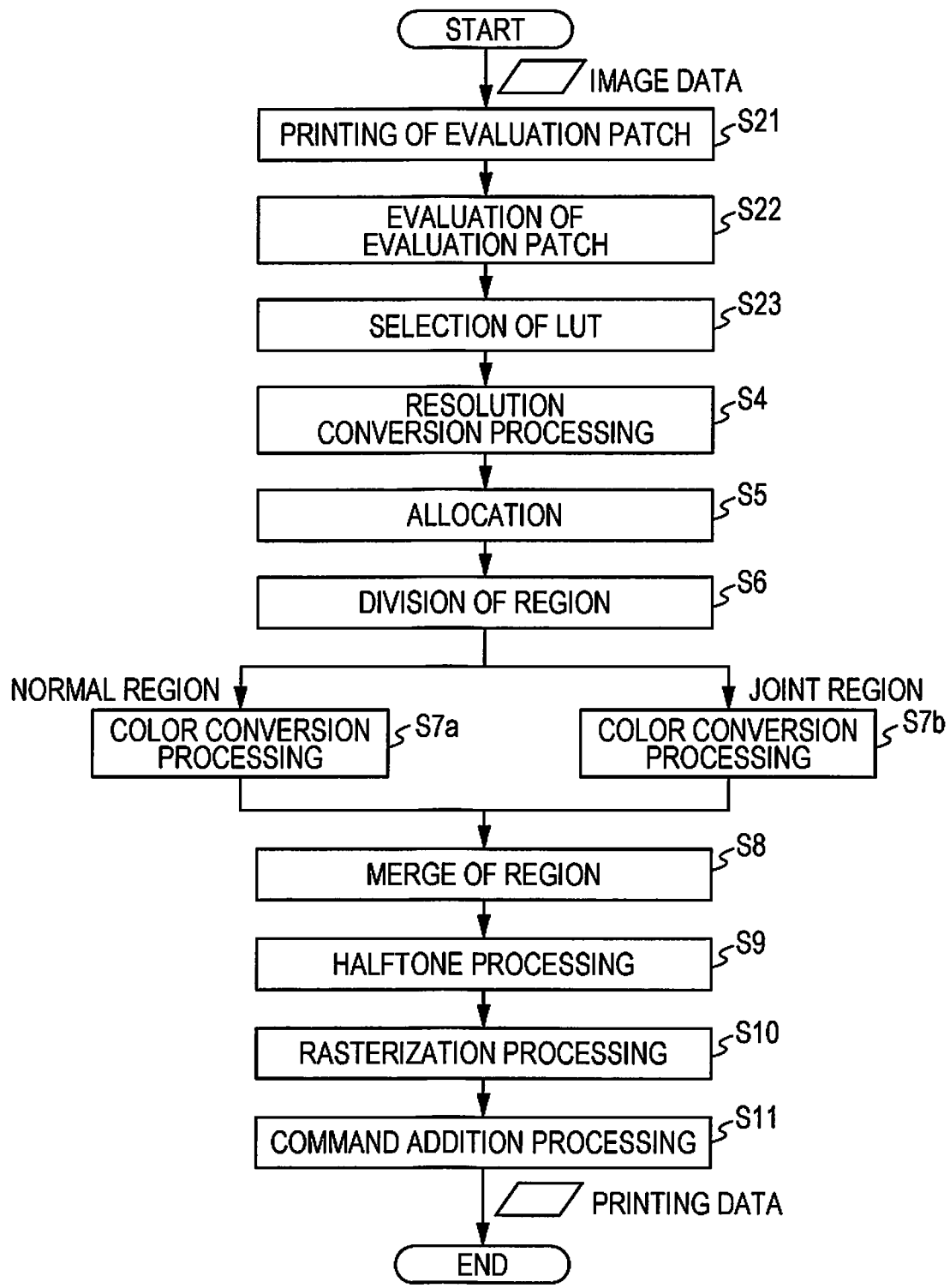
FIG. 11 is a flowchart showing a method of Example 2 for generating printing data.

FIG. 11 is a flowchart showing a method of Example 2 for generating printing data.

In the above example, the case of specifying the type of the printing medium 5 and the environmental temperature and generating the printing data has been described, but in the present example, an example of a case where accurate attribute information for specifying the printing medium 5 cannot be obtained will be described.

As the attribute information of the printing medium 5, attribute information of large classification (plain sheet, coated sheet, film, cloth, or the like) may be input based on appearance and touch, information attached to the product (printing medium 5) and the like.

First, when the printer driver is activated and the evaluation patch is printed on the printing medium 5 (step S21). When the attribute information of large classification of the printing medium 5 is specified and when a plurality of evaluation patch sets associated with the attribute information of the large classification are prepared, the associated evaluation patch set is printed. When there is no particular specification, default evaluation patch prepared in advance is printed.

Next, the printed evaluation patch is evaluated (step S22). As an evaluation method of the evaluation patch, for example, there is a method performed by the operator visually recognizing the printed evaluation patch, or a method of recognizing an image in the printed evaluation patch using an image sensor and the like and making automatic determination by the image processing based on preset threshold information.

As a result of evaluation of the printed evaluation patch set, LUTn (evaluation patch) in which color unevenness is most visually unrecognized in the joint region is selected, and the selection result is input from the input section 112 (step S23).

Processing described below is the same as in Example 1.

That is, next, the printer driver performs resolution conversion processing (step S4) and subsequently performs band printing allocation processing (step S5) based on the image data to be printed. By performing the allocation processing, a desired image can be divided into the normal region formed only by the partial image and the joint region formed by overlapping partial images (step S6). For example, when a printing mode (clean, high definition, high speed, or the like) is specified in advance, allocation processing is performed based on the printing mode.

Next, the printer driver performs color conversion processing for each of the divided regions (independent of the normal region and the joint region). Specifically, for the joint region, color conversion processing is performed using LUTn selected in step S23 (step S7*b*), and for the normal region, color conversion processing is performed using the normal region LUT associated with the normal region (in the evaluation patch selected in step S23) (step S7*a*).

Next, results of the color conversion processing independently performed in the normal region and the joint region (that is, the normal region CMYK data and the joint region CMYK data) are merged into one (step S8).

Thereafter, halftone processing (step S9), rasterization processing (step S10), command addition processing (step S11) and the like are performed to obtain printing data.

According to the method of generating printing data by the above steps, since the color conversion processing of the joint region can be made independent of the normal region and performed more appropriately, it is possible to perform high quality printing in which color unevenness is suppressed even at the printing medium 5 or the printing environmental temperature where color unevenness is easy to be visually recognized in the joint region.

Method of Generating Printing Data: Example 3

Figure 12:
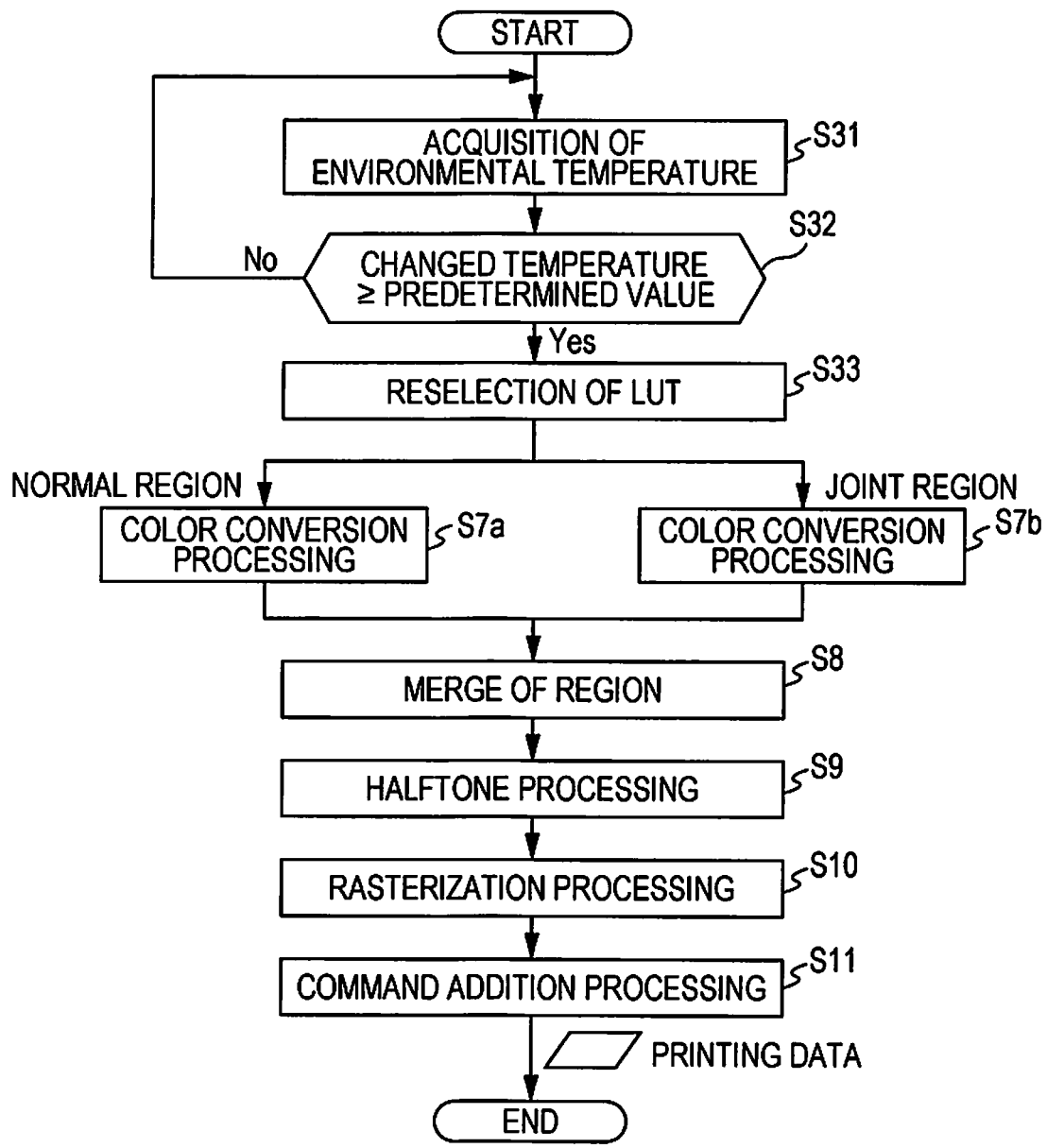
FIG. 12 is a flowchart showing a method of Example 3 for generating printing data.

FIG. 12 is a flowchart showing a method of Example 3 for generating printing data.

In Example 3, a method of printing when the environment changes during printing (temperature in Example 3) (that is, the method of generating printing data and printing based on the generated printing data) will be described.

The method of generating printing data in Example 3 can be applied when the medium type Mn is specified. In a case where the medium type Mn is specified, for example, as in Example 1, by specifying the attribute information of the printing medium 5 the corresponding medium type Mn may be specified, or as in Example 2, by the information of the result of evaluating the evaluation patch the corresponding medium type may be specified.

In the case of Example 2, the medium type Mn is not necessarily specified. For example, the evaluation result shown in FIG. 9 may be obtained in advance, and when the evaluation result is a prerequisite, the corresponding medium type Mn is specified according to the result of evaluating the evaluation patch. Specifically, for example, when LUT 6 is determined to be optimal as a result of evaluating the evaluation patch in the environment to perform printing of 20° C., the corresponding medium type Mn is only the medium type M8, so it can be specified to the medium type M8. Further, for example, when LUT3 is determined to be optimum at 20° C., the medium type M3 and the medium type M4 correspond to each other. However, when a plurality of medium types Mn is hit in this way, it is possible to specify the medium type Mn also by setting a priority order so that one medium type Mn is selected in advance.

In this way, when medium type Mn is specified, detection of the environment to perform printing (for example, temperature) is continued during printing (during execution of a printing job for printing a plurality of sheets) (step S31), and it is determined whether there is a change (for example, change in temperature) exceeding a predetermined threshold in the acquired environmental information (step S32).

The detection of change in printing environmental temperature can be performed, for example, by monitoring the detection result obtained from the sensor for detecting the temperature of the surface to be printed in the printing medium 5 by the printer controller 111 or the control section 30. Alternately, a method in which the operator regularly monitors the environmental temperature and issue an instruction to the printer controller 111 to re-generate printing data when there is a predetermined threshold degree change or a method in which the operator regularly monitors the environmental temperature, regularly inputs the temperature from the input section 112, and re-generate printing data when the printer controller 111 determines that there is a temperature change exceeding the predetermined threshold may be also used.

Here, when there is a change exceeding the predetermined threshold, LUTn of the corresponding temperature in the specified medium type Mn is re-selected (step S33). For example, the evaluation result shown in FIG. 9 can be obtained in advance, where, when the predetermined threshold is set to 5° C., printing is started on the printing medium 5 of the medium type M3 at 20° C. (that is, under the condition of LUT3, printing is started using the generated printing data), and when the temperature is changed to 25° C., LUT2 is re-selected instead of LUT3.

Next, the printer driver performs color conversion processing on the normal region and the joint region based on the re-selected LUTn. Specifically, for the joint region, color conversion processing is performed using LUTn re-selected in step S33 (step S7b), and for the normal region, color conversion processing is performed using the normal region LUT thereto (step S7a). Thereafter, similarly to the embodiment described above, the processing from step S8 to step S11 is performed to re-generate printing data and continue printing based on the new printing data.

In this way, when the environment changes, LUTn can be automatically changed.

As described above, effects obtained from the image processing method, the image processing device and the printing apparatus according the embodiment will be described below.

In the image processing device and in the image processing method in the printing apparatus including the image processing device according to the embodiment a desired image (image to be printed on the printing medium 5) is divided into the normal region formed with the partial images and the joint region formed by overlapping partial images based on image data in the RGB color space. Also, image data corresponding to the normal region in the RGB color space is converted into normal region CMYK data in the CMYK color space using the normal region LUT. Further, image data corresponding to the joint region in the RGB color space is converted to the joint region CMYK data in the CMYK color space using the joint region LUT selected based on the attribute information of the printing medium 5 on which printer 100 is to perform printing and the environmental information of the environment in which the printer 100 is to perform printing from among a plurality of joint region LUTs corresponding to a plurality of predetermined types of printing mediums 5 and a plurality of predetermined environments. Next, printing data is generated based on the normal region CMYK data and the joint region CMYK data.

That is, according to the embodiment, data of the RGB color space can be converted into data of the CMYK color space using different conversion tables for image data of the normal region formed with the partial images and image data of the joint region formed by overlapping partial images.

Image data of the joint region formed by overlapping partial images is converted using the conversion table (joint region LUT) derived based on attribute information of the printing medium 5 and environmental information of the environment in which the printer 100 is to perform printing. Therefore, in a case where the gradation of the joint region formed by overlapping partial images changes depending on the type of the printing medium 5 (for example, difference in permeability due to difference in materials) or the environment to perform printing (for example, difference in temperature), it is possible to make an appropriate correction according to the degree thereof. As a result, in printing a desired image formed by combining partial images, even when the printing medium 5 or the printing environment changes, occurrence of banding due to partial images is suppressed and higher quality can be performed.

Further, a plurality of joint region LUTs corresponding to a plurality of predetermined types of printing mediums 5 and a plurality of predetermined environments are prepared in advance, whereby it is possible to select an appropriate joint region LUT corresponding to the attribute information of the printing medium 5 on which the printer 100 is to perform printing and the environmental information of the environment in which the printer 100 is to perform printing. As a result, faster processing can be performed, for example, compared to a case where the joint region LUT is calculated as a function or the like.

In addition, in a case where gradation of the joint region formed by overlapping partial images changes depending on the printing environmental temperature, it is possible to make an appropriate correction according to the degree thereof. As a result, even when the printing environmental temperature in printing a desired image constituted by a combination of partial images, the occurrence of banding due to partial images is suppressed, whereby it is possible to perform a higher quality of printing.

In addition, the present invention is not limited to the embodiment described above, and various modifications and improvements can be added to the embodiment described above. Modification examples will be described below. Here, the same references are used for the same constituent parts as those in the embodiment uses, and redundant description will be omitted.

Modification Example 1

In the embodiment, an example has been described in which the first image region (normal region) is a region formed only by partial images, and the second image region (joint region) is a region formed by overlapping 2 partial images. However, the relationship between the first image region and the second image region is not limited thereto. For example, the first image region may be a region formed by overlapping a plurality of partial images, and the second image region may be a region formed by overlapping more partial images than those that form first image region. In a case where color unevenness occurs due to difference in number between overlapped partial images in the first image region and the second image region, the gradation value of the second image region is obtained by using the conversion table (color conversion look-up table) derived based on the attribute information of the printing medium 5 and the environmental information of the environment in which the printer 100 is to perform printing, thereby likewise making it possible to suppress the occurrence of color unevenness.

Modification Example 2

In the embodiment described above, as shown in FIG. 1, the printer 100 has been described as an ink jet printer that is designed to be an elongated printing medium 5 supplied in a state in which it is wound in a roll. However, the printing medium is not limited to the printing medium 5 in the rolled state, and may be a single-fed-type sheet (cut sheet) or the like. In a case of the single-fed-type sheet, in place of the supply unit 51, for example, a supply mechanism including a separator for supplying sheets one by one is provided, and in place of the storage unit 52, for example, a storage tray for storing sheets to be discharged after printing is provided.

Modification Example 3

In the embodiment described above, the printer 100 has been described as an example of a serial printer with the printing head 13 reciprocating in the scanning direction, but it is not limited to the serial printer. For example, the printer may be a line printer having a line head in which nozzles are arranged in a width direction of the printing medium, or may be an area printer which collectively prints partial images with nozzles arranged throughout the entire band width. Above-mentioned printers can also have the similar effect by using the same method when the printers form a desired image with the region formed only by the partial image and the region formed by overlapping partial images.

Modification Example 4

In the embodiment described above, as a method of deriving a joint region LUT the method of selecting among a plurality of joint region LUTs prepared in advance has been described, but it is not limited thereto, and a method of calculating an appropriate joint region LUT using a function may be used. For example, the joint region LUT is calculated as a function with the temperature of the printing environment as a variable, whereby it is possible to generate printing data corresponding to a more minute temperature change.

Modification Example 5

In the embodiment described above, as the environmental information of the environment in which the printer 100 is to perform printing, temperature has been mainly described as an example, but it is limited to temperature. For example, it may be humidity or temperature and humidity in the environment in which printing is to be performed. For example, in a case where ink droplets applied to pass1 dry to some extent, and then ink droplets in pass2 are applied, the rate at which the color material of pass2 remains near the surface of the printing medium 5 is larger than when it is in normal printing (the case where ink droplets are applied to the entire surface in pass1). Accordingly, in a case where color unevenness in the joint region is visually recognized, or the like, a joint region LUT corresponding to a parameter including humidity is derived to generate printing data, thereby making it possible to perform good printing in response to a change in humidity.

This application claims priority under 35 U.S.C. § 119 to Japanese Patent Application No. 2017-009165, filed Jan. 23 2017. The entire disclosure of Japanese Patent Application No. 2017-009165 is hereby incorporated herein by reference.

What is claimed is:

1. An image processing method of generating printing data for causing a printing apparatus to perform printing, the printing apparatus printing a desired image on a printing medium by repeatedly performing a partial printing operation of printing partial images that constitute a part of the desired image based on first image data in a first color space and a transport operation of moving the printing medium, the method comprising:
dividing the desired image into a first image region formed with the partial images and a second image region formed by overlapping the partial images,
first converting the first image data in the first color space corresponding to the first image region into second image data in a second color space using a first conversion table that has a gradation value,
preparing a plurality of second conversion tables which have different gradation values from each other, include a base conversion table that is the same as the first conversion table, a plurality of conversion tables each of which has a gradation value greater than a gradation value of the base conversion table, and a plurality of conversion tables each of which has a gradation value less than the gradation value of the base conversion table, and are used for converting the first image data in the first color space corresponding to the second image region into third image data in the second color space,
selecting one second conversion table from the plurality of second conversion tables based on attribute information of the printing medium on which the printing apparatus is to perform printing and environmental information of an environment in which the printing apparatus is to perform printing,
second converting the first image data in the first color space corresponding to the second image region into the third image data in the second color space using the one second conversion table that has been selected, and
generating the printing data based on the second image data and the third image data.

2. The image processing method according to claim 1, further comprising storing information associating the plurality of second conversion tables with a plurality of predetermined types of printing mediums and a plurality of predetermined environments, wherein
the one second conversion table is selected from among the plurality of second conversion tables, using the information.

3. The image processing method according to claim 1, wherein the environmental information is temperature.

4. An image processing device for generating printing data for causing a printing apparatus to perform printing, the printing apparatus printing a desired image on a printing medium by repeatedly performing a partial printing operation of printing partial images that constitute a part of the desired image based on first image data in a first color space and a transport operation of moving the printing medium, the device comprising:
an image data acquisition section that acquires a first image data,
an input section that inputs attribute information of the printing medium on which the printing apparatus is to perform printing and environmental information of an environment in which the printing apparatus is to perform printing,
an image processing section that generates the printing data based on the acquired first image data; and
a transmission section that transmits the generated printing data to the printing apparatus,
wherein the image processing section
divides the desired image into a first image region formed with the partial images and a second image region formed by overlapping the partial images,
converts the first image data in the first color space corresponding to the first image region into second image data in a second color space using a first conversion table that has a gradation value,
selects one second conversion table from a plurality of second conversion tables which have been prepared so as to have different gradation values from each other and include a base conversion table that is the same as the first conversion table, a plurality of conversion tables each of which has a gradation value greater than a gradation value of the base conversion table, and a plurality of conversion tables each of which has a gradation value less than the gradation value of the base conversion table, and which are used for converting the first image data in the first color space corresponding to the second image region into third image data in the second color space, based on the attribute information that is input to the input section and the environmental information that is input to the input section, converts the first image data in the first color space corresponding to the second image region into the third image data in the second color space using the one second conversion table that has been selected, and generates the printing data based on the second image data and the third image data.

5. The image processing device according to claim 4, further comprising a storage storing information associating the plurality of second conversion tables with a plurality of predetermined types of printing mediums and a plurality of predetermined environments, wherein the image processing section converts the first image data in the first color space corresponding to the second image region into the third image data in the second color space using the one second conversion table that has been selected based on the information, from among the plurality of second conversion tables.

6. The image processing device according to claim 4, wherein the environmental information is temperature.

7. An image processing device for generating printing data for causing a printing apparatus to perform printing, the printing apparatus printing a desired image on a printing medium by repeatedly performing a partial printing operation of printing partial images that constitute a part of the desired image based on first image data in a first color space and a transport operation of moving the printing medium, the device comprising:

an image data acquisition section that acquires a first image data, an input section that inputs attribute information of the printing medium on which the printing apparatus is to perform printing and environmental information of an environment in which the printing apparatus is to perform printing, an image processing section that generates the printing data based on the acquired first image data, and a transmission section that transmits the generated printing data to the printing apparatus, wherein the image processing section divides the desired image into a first image region formed with a plurality of partial images and a second image region formed by overlapping more partial images than the partial images constituting the first image region, converts the first image data in the first color space corresponding to the first image region into second image data in a second color space using a first conversion table that has a gradation value, selects one second conversion table from a plurality of second conversion tables which have been prepared so as to have different gradation values from each other and include a base conversion table that is the same as the first conversion table, a plurality of conversion tables each of which has a gradation value greater than a gradation value of the base conversion table, and a plurality of conversion tables each of which has a gradation value less than the gradation value of the base conversion table, and which are used for converting the first image data in the first color space corresponding to the second image region into third image data in the second color space, based on the attribute information and the environmental information, converts the first image data in the first color space corresponding to the second image region into the third image data in the second color space using the one second conversion table that has been selected, and generates the printing data based on the second image data and the third image data.

8. A printing system comprising:
the image processing device according to claim 4; and
a printing apparatus for performing printing based on printing data generated by the image processing device.

9. A printing system comprising:
the image processing device according to claim 5; and
a printing apparatus for performing printing based on printing data generated by the image processing device.

10. A printing system comprising:
the image processing device according to claim 6; and
a printing apparatus for performing printing based on printing data generated by the image processing device.

11. A printing system comprising:
the image processing device according to claim 7; and
a printing apparatus for performing printing based on printing data generated by the image processing device.

* * * * *